(12) United States Patent
Takahashi et al.

(10) Patent No.: US 8,096,272 B2
(45) Date of Patent: Jan. 17, 2012

(54) VARIABLE VALVE DEVICE FOR ENGINE

(75) Inventors: Seigo Takahashi, Shizuoka (JP); Hidetoshi Ishigami, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 244 days.

(21) Appl. No.: 12/392,342

(22) Filed: Feb. 25, 2009

(65) Prior Publication Data

US 2009/0211548 A1    Aug. 27, 2009

(30) Foreign Application Priority Data

Feb. 26, 2008    (JP) ................... 2008-043864

(51) Int. Cl.
*F01L 1/34*    (2006.01)
(52) U.S. Cl. ................... 123/90.16; 123/90.15
(58) Field of Classification Search ............. 123/90.15, 123/90.16
See application file for complete search history.

(56) References Cited

U.S. PATENT DOCUMENTS

| 6,997,161 | B2 | 2/2006 | Fuwa et al. |
| 7,210,450 | B2 | 5/2007 | Arinaga et al. |
| 2007/0101956 | A1 | 5/2007 | Schafer et al. |
| 2007/0175427 | A1 | 8/2007 | Inoue et al. |

FOREIGN PATENT DOCUMENTS

| EP | 1 403 487 A2 | 3/2004 |
| EP | 1 630 365 A1 | 3/2006 |
| JP | 8-200020 A | 8/1996 |
| JP | 2001-82190 A | 3/2001 |
| JP | 2003-41976 A | 2/2003 |
| JP | 2003-41977 A | 2/2003 |
| JP | 2004-48875 A | 2/2004 |
| JP | 2004-353483 A | 12/2004 |
| JP | 2006-132327 A | 5/2006 |
| JP | 2007-198314 A | 8/2007 |

OTHER PUBLICATIONS

Official Communication issued in corresponding European Patent Application No. 09002774.9, mailed on Sep. 30, 2010.

*Primary Examiner* — Zelalem Eshete
(74) *Attorney, Agent, or Firm* — Keating & Bennett, LLP

(57) ABSTRACT

A variable valve device, which is capable of automatically canceling a deviation in the relationship between the rotation angle of a control shaft and the lift degree generated because of the disassembling and assembling of an engine, includes a target lift degree calculator that calculates a target lift degree, a motor driver that drives a brushless DC motor that rotates the control shaft until the lift degree reaches the target lift degree, and an automatic deviation canceller that automatically cancels the deviation. More specifically, the magnetic pole pulse pattern of the motor before the engine starts is obtained and it is determined whether the pattern match magnetic pole pulse pattern stored before the engine stops. If they do not match, an idle lift degree is set, the idle lift degree is changed so that the engine speed is within the tolerance range of an idle engine speed, the rotation angle for the idle portion is subtracted from the obtained angle of the control shaft and a reference angle is updated by the difference.

10 Claims, 18 Drawing Sheets

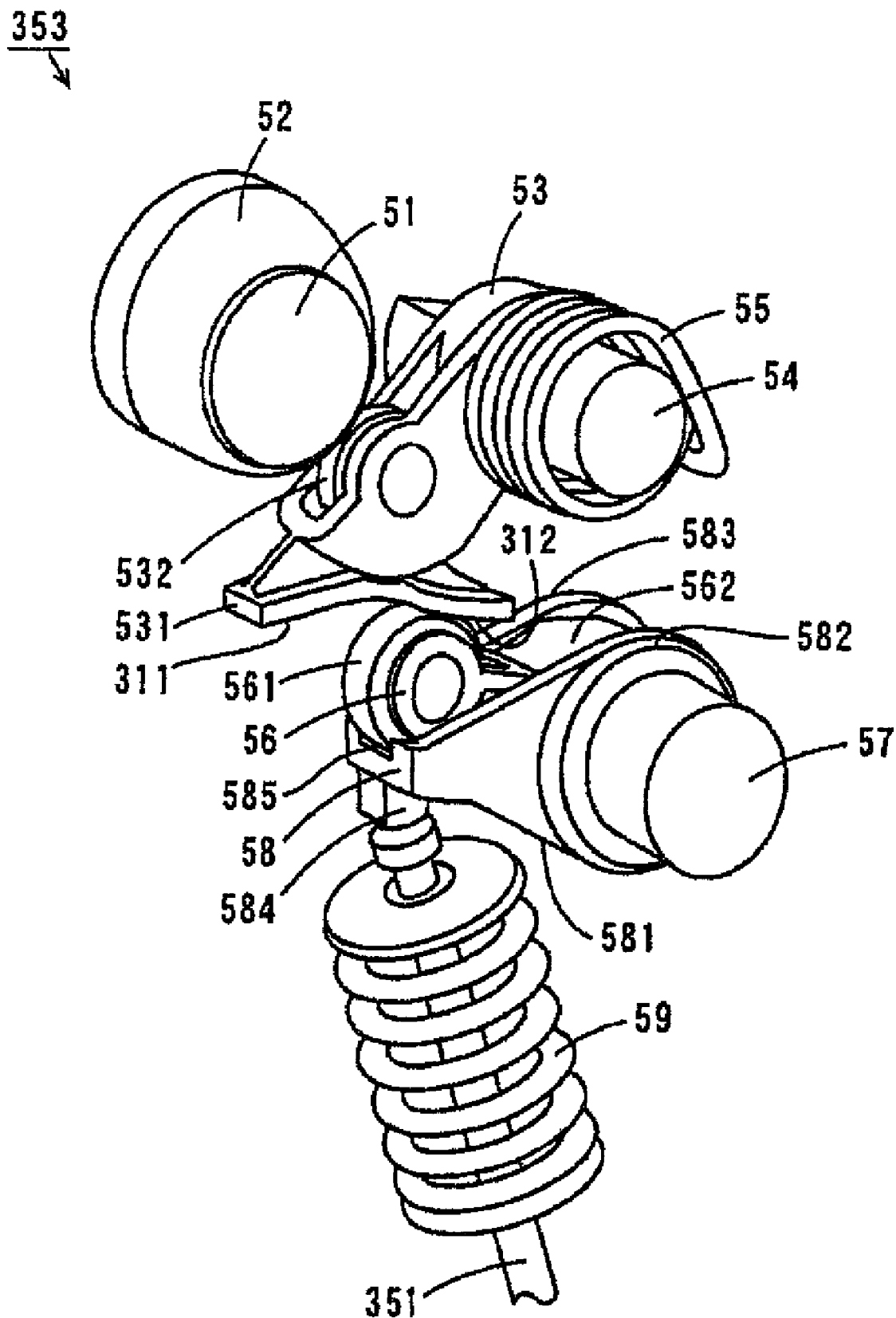

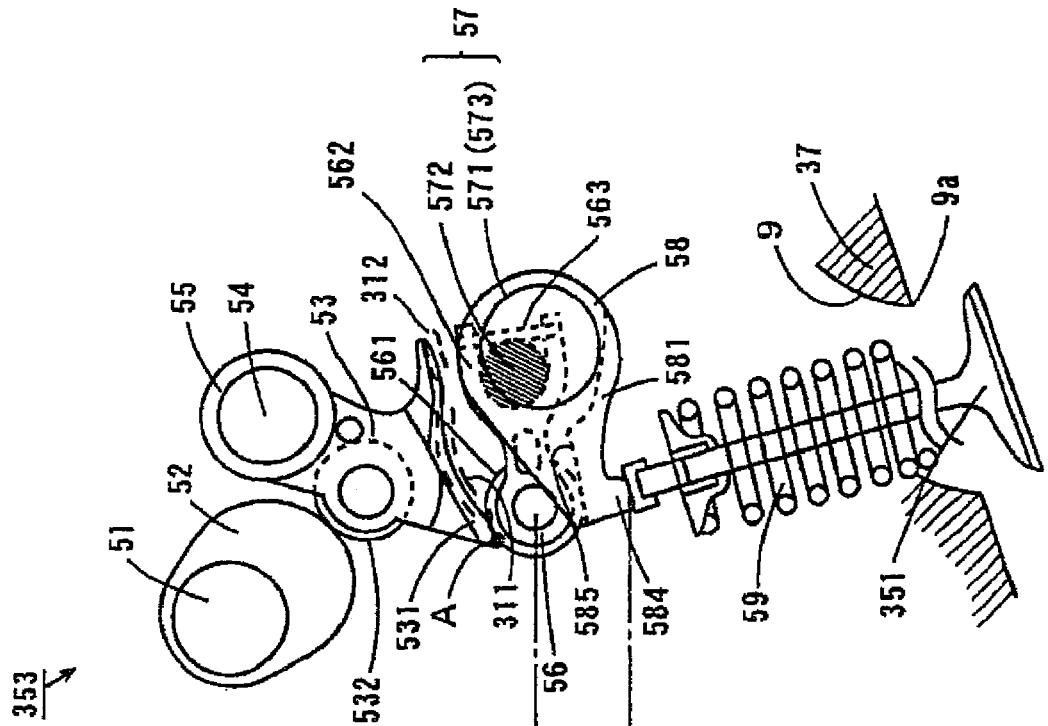
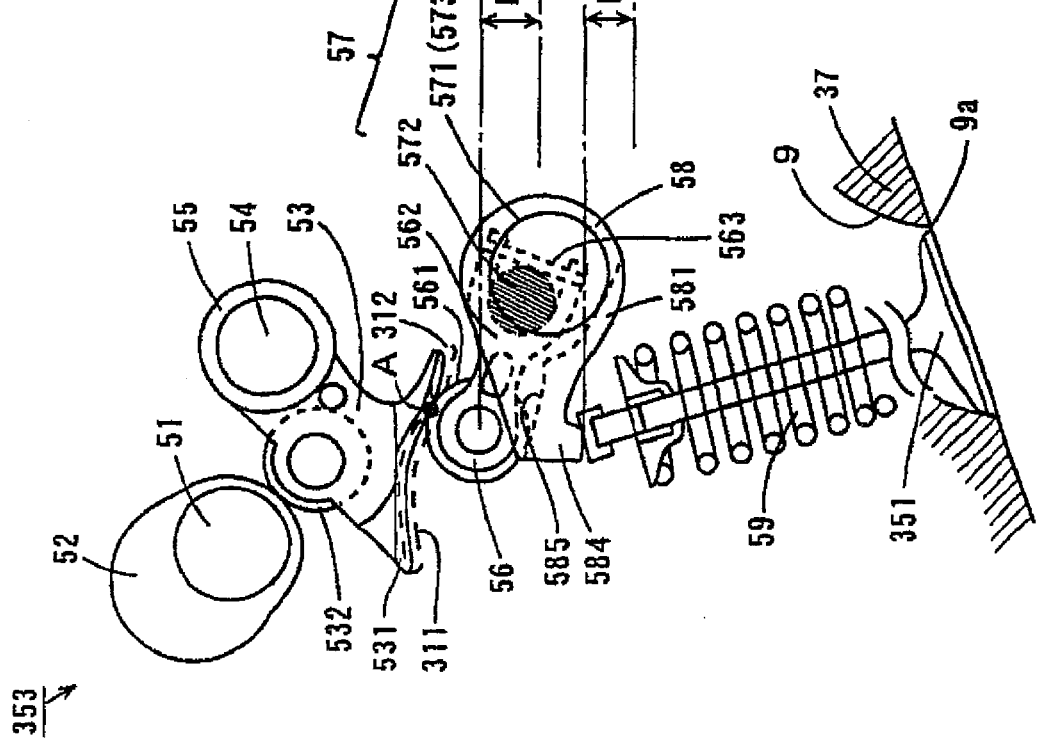

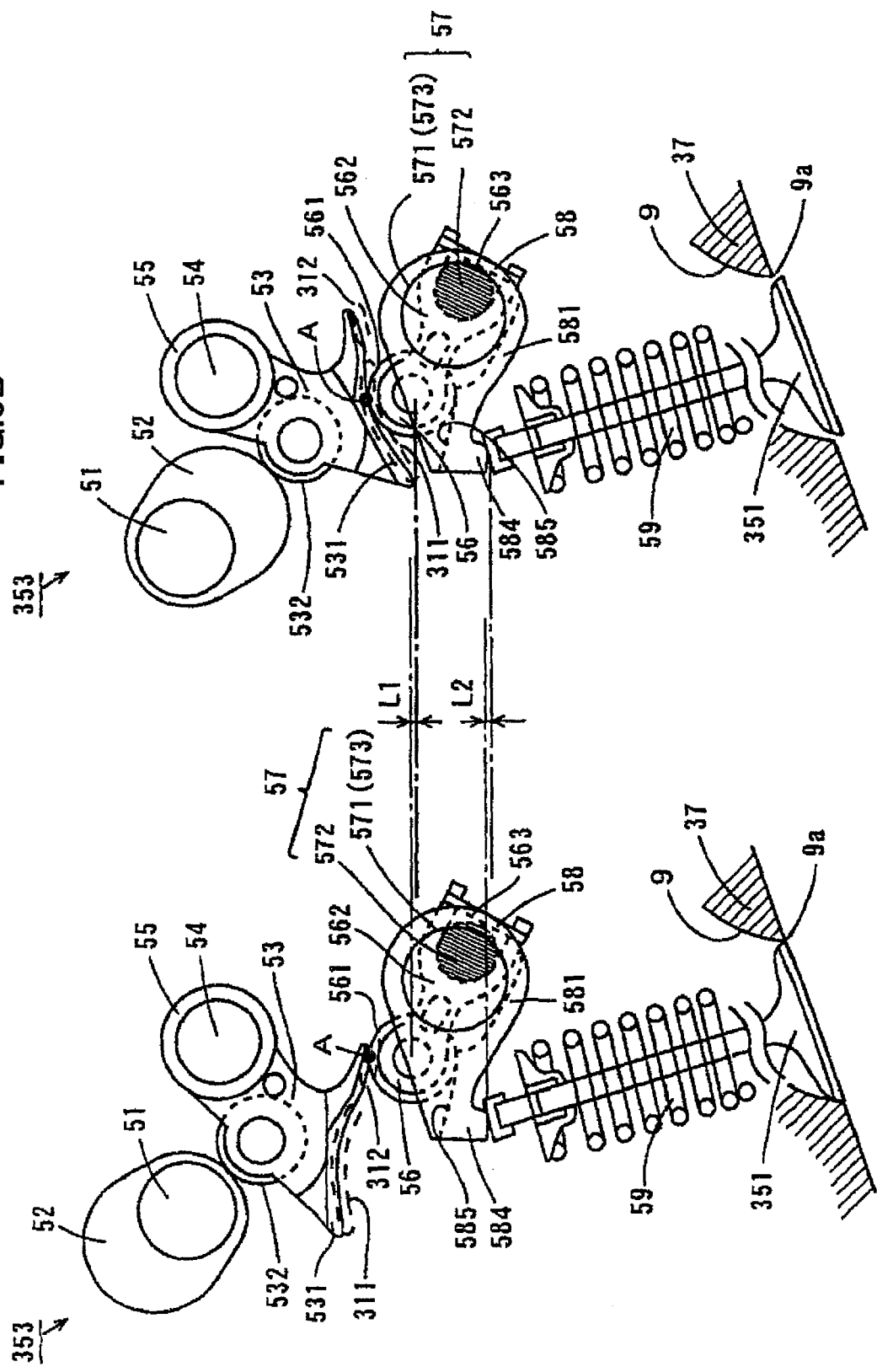

VARIABLE VALVE DEVICE FOR ENGINE

BACKGROUND OF THE INVENTION

1. Field of the Invention

The present invention relates to a variable valve device and more specifically to a variable valve device used to change the lift degree of an intake valve in an engine.

2. Description of the Background Art

JP 2003-41976 A discloses a device that detects the operation angle of a control shaft in a variable valve mechanism (variable valve device) that continuously changes the valve lift degree and the valve operation angle of an intake valve in an internal combustion engine according to the operation angle (rotation angle) of the control shaft. The device includes an operation angle sensor (control shaft sensor) that generates an output according to the operation angle of the control shaft, so that an intake air amount is estimated based on the operation angle detected based on the output.

There is a certain relationship between the operation angle of the control shaft and the valve lift degree. However, the relationship changes when the variable valve mechanism is disassembled once and re-assembled, and the intake air amount cannot be estimated correctly in some cases. In such a case, the engine cannot be operated normally because the fuel injection amount, the fuel injection timing and the ignition timing cannot be controlled correctly based on the intake air amount.

SUMMARY OF THE INVENTION

In order to overcome the problems described above, preferred embodiments of the present invention provide a variable valve device that allows an engine to be operated normally when the variable valve device is disassembled once and re-assembled.

A variable valve device according to a preferred embodiment of the present invention includes a control shaft, an angle specifying information obtainer and a changer. The control shaft is arranged to change a lift degree of an intake valve in an engine. The angle specifying information obtainer is arranged to obtain angle specifying information specifying a rotation angle of the control shaft. The changer is arranged to change an adjustment angle if an information difference between the angle specifying information obtained by the angle specifying information obtainer before the engine starts and predetermined reference angle specifying information is not within a predetermined information range. The adjustment angle is the rotation angle of the control shaft after the engine starts and while an accelerator is not operated.

The angle specifying information may preferably include, for example, the rotation angle of the control shaft detected by a control shaft sensor and a rotation angle of a motor (such as a magnetic pole pulse pattern detected by magnetic pole sensors in a brushless DC motor). The reference angle specifying information may preferably include, for example, a reference angle of the control shaft when the lift degree of the intake valve is minimized and a reference rotation angle of the motor (such as reference magnetic pole pulse pattern detected by magnetic pole sensors in the brushless DC motor). The adjustment angle may preferably include, for example, an idle angle (the rotation angle of the control shaft corresponding to the lift degree in an idling state that is necessary to start the engine) and a reference angle.

According to a preferred embodiment of the present invention, the angle specifying information of the control shaft is obtained before the engine starts and the adjustment angle is changed if the information difference between the obtained angle specifying information and the predetermined reference angle specifying information is not within the predetermined information range. Therefore, the engine can normally be operated if the variable valve device is disassembled once and re-assembled.

The variable valve device may further include a motor and a motor driver. The motor is arranged to rotate the control shaft. The motor driver is arranged to drive the motor. If the information difference is not within the predetermined information range, the changer is arranged to allow the motor driver to drive the motor so that an engine speed of the engine is within a predetermined speed range. When the engine speed is within the predetermined speed range, the changer is arranged to change the adjustment angle based on the angle specifying information obtained by the angle specifying information obtainer.

In this way, if the information difference between the angle specifying information obtained before the engine starts and the predetermined reference angle specifying information is not within the predetermined range, the motor is driven so that the engine speed is within the predetermined speed range and the adjustment angle is updated based on the angle specifying information obtained when the engine speed is within the predetermined speed range. Therefore, a deviation generated in the relationship between the lift degree and the angle specifying information is automatically cancelled.

The variable valve device may further include a gear position determiner, for example. The gear position determiner is arranged to determine whether a gear position of a transmission is neutral. If the gear position of the transmission is neutral as determined by the gear position determiner, the changer is arranged to allow the motor driver to drive the motor so that the engine speed is within the predetermined speed range.

In this way, the adjustment angle is changed when the gear position of the transmission is neutral, and therefore the adjustment angle is correctly updated.

The variable valve device may further include an accelerator opening degree determiner, for example. The accelerator opening degree determiner is arranged to determine whether an opening degree of the accelerator is zero for at least a predetermined period. As determined by the accelerator opening degree determiner, if the opening degree of the accelerator is zero for at least the predetermined period, the changer is arranged to allow the motor driver to drive the motor so that the engine speed is within a predetermined speed range.

In this way, the adjustment angle is changed when the accelerator is not operated and the opening degree of the accelerator is zero for at least the predetermined period. Therefore, the adjustment angle is correctly updated after the engine speed is stabilized.

The variable valve device may further include a motor driving determiner and a motor driving prohibiter, for example. The motor driving determiner is arranged to determine whether the motor is actually driven by attempting to drive the motor if the information difference is not within the predetermined information range. The motor driving prohibiter is arranged to prohibit the motor driver from driving the motor if the motor is not driven as determined by the motor driving determiner.

In this way, if the information difference between the angle specifying information of the control shaft obtained before the engine starts and the predetermined reference angle specifying information is not within the predetermined information range, the motor is not actually driven despite the attempt to drive the motor, the motor is prohibited from being driven. Therefore, it is determined that the reference angle specifying information has changed because of a damage or failure not because of the disassembling and assembling of the variable valve device, and the motor is not driven.

The angle specifying information obtainer may include a control shaft sensor and a control shaft rotation amount estimator, for example. The control shaft sensor is arranged to detect the rotation angle of the control shaft. The control shaft rotation amount estimator is arranged to calculate the rotation angle of the motor and calculate an estimated rotation amount of the control shaft based on the calculated rotation angle. The variable valve device may further include a rotation amount difference determiner and a motor driving prohibiter, for example. The rotation amount difference determiner is arranged to determine whether an amount difference between the actual rotation amount calculated based on the rotation angle detected by the control shaft sensor by the control shaft sensor and the estimated rotation amount calculated by the control shaft rotation amount estimator is within a predetermined amount range. The motor driving prohibiter is arranged to prohibit the motor driver from driving the motor if the amount difference is not within the predetermined amount range as determined by the rotation angle amount difference determiner.

In this case, if the information difference between the angle specifying information of the control shaft obtained before the engine starts and the predetermined reference angle specifying information is not within the predetermined information range, an estimated rotation amount of the control shaft is calculated based on the rotation angle of the motor, and if the amount difference between the estimated amount and the actual rotation amount that is calculated based on the angle detected by the control shaft sensor is not within the predetermined amount range, the motor is prohibited from being driven. Therefore, it is determined that the reference angle specifying information has changed because of a damage or failure not because of the disassembling and assembling of the variable valve device, and the motor is not driven.

The variable valve device may further include an alarm, for example. The alarm is arranged to notify a driver of a vehicle having the engine of predetermined information if the information difference is not within a predetermined information range.

In this case, if the information difference between the angle specifying information of the control shaft obtained before the engine starts and the predetermined reference angle specifying information is not within the predetermined information range, the driver is notified of the predetermined information. Therefore, the driver can be given various warnings including the prohibition of gear position change, for example, in the process of automatically canceling a deviation generated in the relationship between the lift degree and the angle specifying information because of the disassembling and assembling of the variable valve device.

The variable valve device may further include a reference angle specifying information updater, for example. The reference angle specifying information updater is arranged to update the predetermined reference angle specifying information with angle specifying information obtained by the angle specifying obtainer after the engine stops.

In this way, the reference angle specifying information is updated with the angle specifying information obtained after the engine stops, and therefore any deviation generated in the relationship between the lift degree and the angle specifying information while the engine is operated can be canceled after the engine stops.

Other features, elements, steps, characteristics and advantages of the present invention will become more apparent from the following detailed description of preferred embodiments of the present invention with reference to the attached drawings.

BRIEF DESCRIPTION OF THE DRAWINGS

FIG. 3 is a perspective view of a portion of an intake valve driving mechanism having the variable valve device shown in FIG. 2.

FIGS. 4A and 4B show the state of the intake valve driving mechanism having the variable valve device when the lift degree of the intake valve is maximized, FIG. 4A shows the fully open state and FIG. 4B shows the fully closed state.

FIGS. 5A and 5B show the state of the intake valve driving mechanism having the variable valve device when the lift degree of the intake valve is minimized, FIG. 5A shows the fully closed state and FIG. 5B shows the fully open state.

FIG. 11 is a flowchart showing the control operation carried out by the ECU shown in FIG. 9 when the power supply is on.

DETAILED DESCRIPTION OF THE PREFERRED EMBODIMENTS

Figure 1:
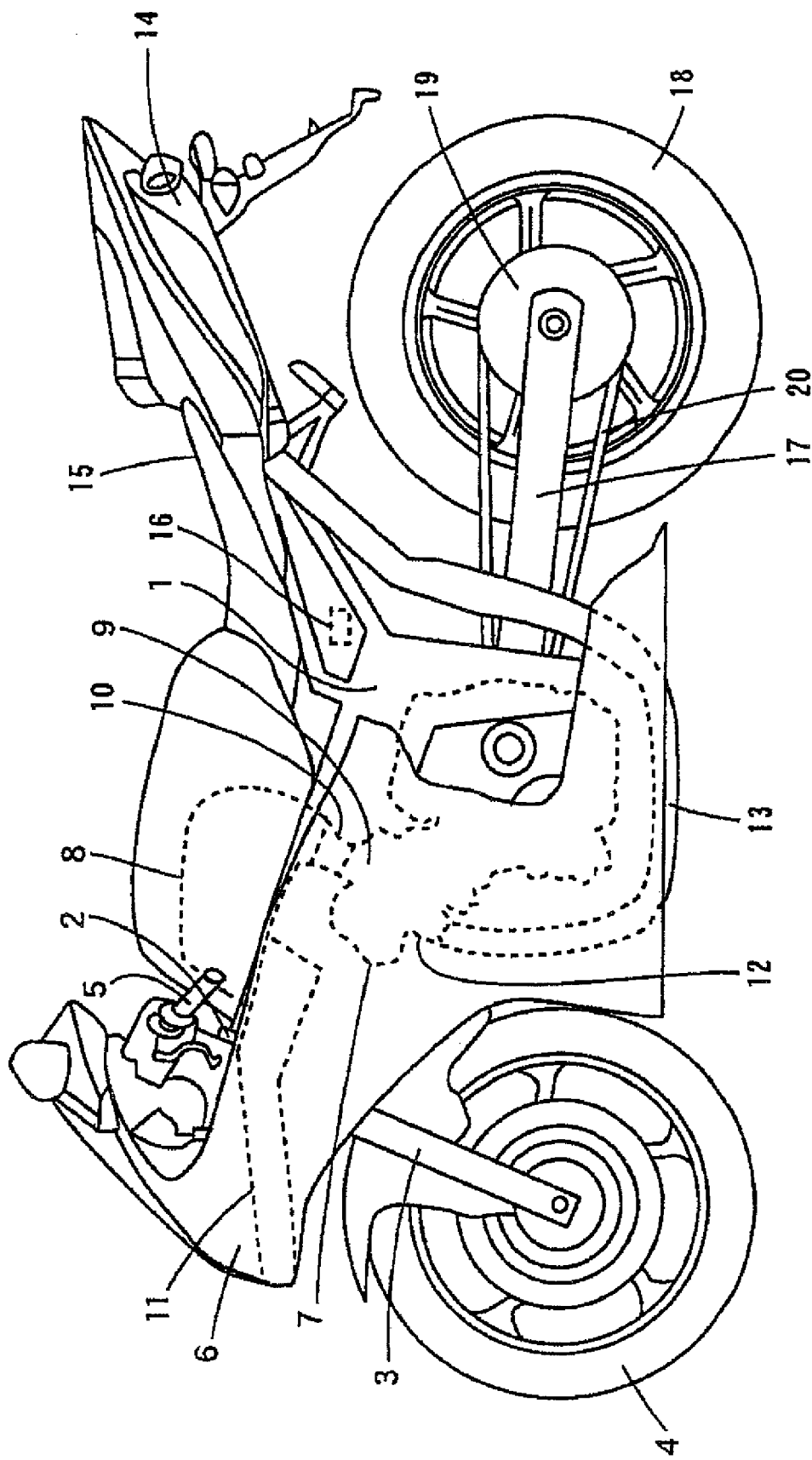
FIG. 1 is a side view of the general structure of a motorcycle including a variable valve device according to a preferred embodiment of the present invention.

Now, preferred embodiments of the present invention will be described in detail with reference to the accompanying drawings, in which the same or corresponding portions are denoted by the same reference characters, and their description will not be repeated.

(1) General Structure of Motorcycle

Referring to FIG. 1, the motorcycle 100 having a variable valve device according to a preferred embodiment of the present invention includes a mainframe 1. A head pipe 2 is provided at the front end of the main frame 1. A front fork 3 is provided pivotably at the head pipe 2. A front wheel 4 is rotatably supported at the lower end of the front fork 3. A handle 5 is attached at the upper end of the front fork 3.

A cowl 6 is arranged to cover the front and sides of the main frame 1. A four-cylinder engine, for example, (hereinafter simply as "engine") 7 is provided in the center of the main frame 1. An air cleaner box 8 is provided at the upper part of the engine 7. An intake pipe 10 is arranged so that the air cleaner box 8 and the intake port 9 of the engine 7 are connected.

An intake passage 11 to allow the air cleaner box 8 to communicate with the outside is at the front of the motorcycle 100 as it is covered with the cowl 6. One end of the intake passage 11 is open at the front of the cowl 6. Air from the outside of the motorcycle 100 is taken into the engine 7 through the intake passage 11, the air cleaner box 8 and the intake pipe 10.

One end of an exhaust pipe 13 is connected to the exhaust port 12 of the engine 7. The other end of the exhaust pipe 13 is connected to a muffler device 14. Exhaust gas generated by combustion of air-fuel mixture in the engine 7 is discharged to the outside through the exhaust pipe 13 and the muffler device 14.

A seat 15 is provided on the top of the engine 7. An ECU (Electronic Control Unit) 16 that controls the operation of various elements of the motorcycle 100 is provided under the seat 15. Details of the ECU 16 will later be described. A rear arm 17 is connected to the main frame 1 to extend to the back of the engine 7. A rear wheel 18 and a rear wheel driven sprocket 19 are rotatably held by the rear arm 17. The rear wheel driven sprocket 19 is provided with a chain 20. The power generated by the engine 7 is transmitted to the rear wheel driven sprocket 19 through the chain 20. In this way, the rear wheel 18 is rotated.

(2) Structure of Engine

Figure 2:
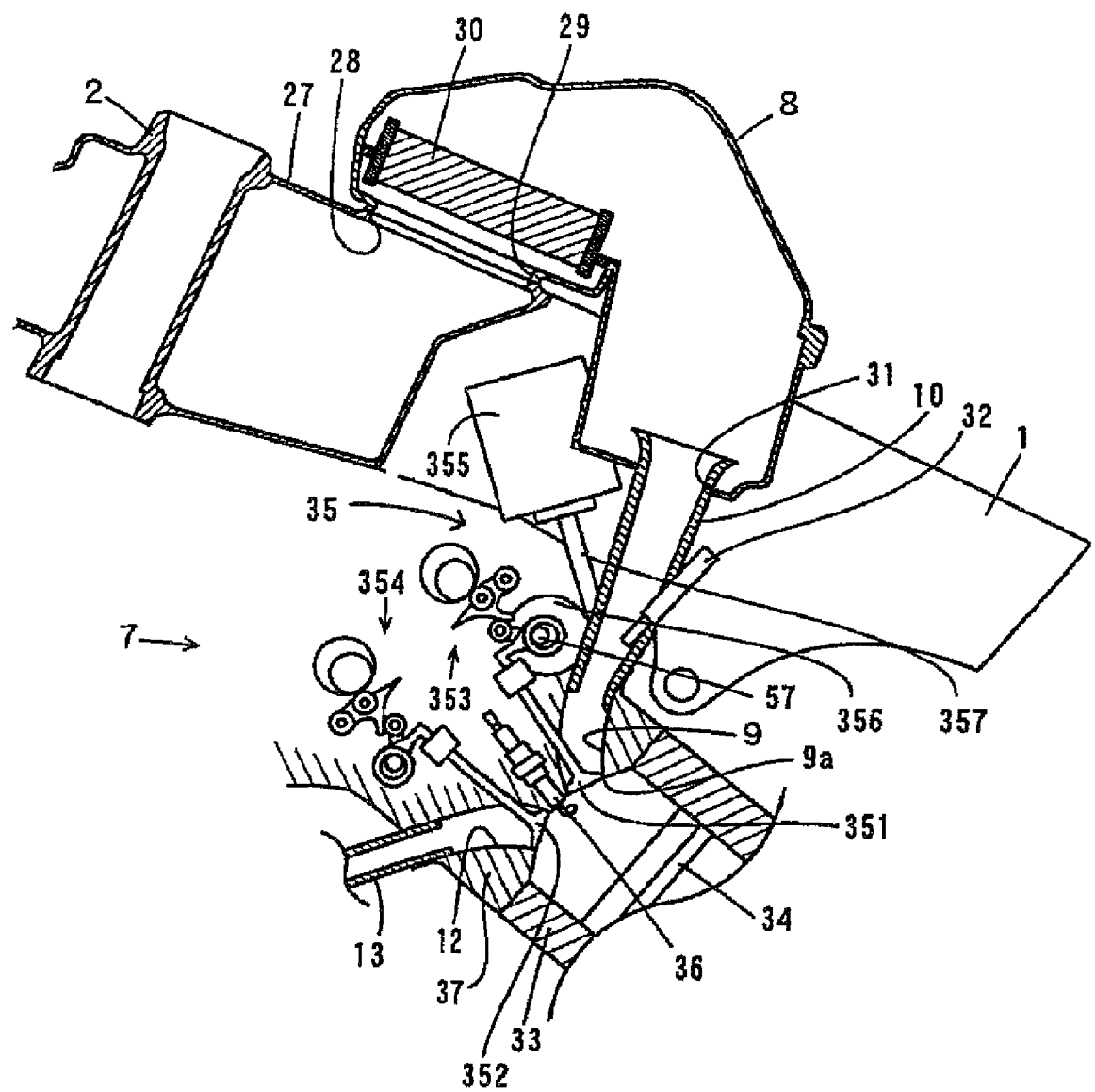
FIG. 2 is a longitudinal section of the intake system and the periphery of the engine in the motorcycle shown in FIG. 1.

Referring to FIG. 2, an air cleaner element 30 is provided in the vicinity of an opening 29 on one end in the air cleaner box 8. The air cleaner element 30 removes dust or the like included in air coming into the air cleaner box 8 from an air distribution box 27.

One end of the intake pipe 10 is connected to an opening 31 on the other end of the air cleaner box 8. The other end of the intake pipe 10 is connected to an opening on the upstream side of the intake port 9 of the engine 7. The intake pipe 10 is provided with an injector 32 used to supply fuel to the engine 7.

The engine 7 includes a cylinder 33, a piston 34, an ignition plug 36, a cylinder head 37, an intake valve 351, an exhaust valve 352, an intake valve driving mechanism 353, and an exhaust valve driving mechanism 354. The intake valve 351 and the exhaust valve 352 are driven by the intake valve driving mechanism 353 and the exhaust valve driving mechanism 354, respectively.

The engine 7 preferably has four cylinders 33, for example, although they are not shown. The piston 34, the ignition plug 36, the cylinder head 37, the intake valve 351, the exhaust valve 352, the intake valve driving mechanism 353, and the exhaust valve driving mechanism 354 are provided for each of the cylinders 33.

The intake valve driving mechanism 353 is provided with a variable valve device 35 used to continuously change the displacement (lift degree) of the intake valve 351 according to the engine speed of the engine 7 and the opening degree of the accelerator. The variable valve device 35 includes a control shaft 57, a control shaft sensor (not shown), and a motor 355. The intake valve driving mechanism 353 is coupled with the control shaft 57 and a worm wheel 356. The motor 355 has a rotation shaft 357 having a worm. The worm of the rotation shaft 357 and worm wheel 356 define a worm gear mechanism. The rotation force generated by the motor 355 is transmitted to the intake valve driving mechanism 353 through the rotation shaft 357, the worm wheel 356 and the control shaft 57. In this way, the state of the intake valve driving mechanism 353 is adjusted and the lift degree of the intake valve 351 is adjusted, details of which will be described in the following paragraphs.

In this way, air from the outside is taken into the cylinders 33 of the engine 7 through the air distribution box 27, the air cleaner box 8, and the intake pipe 10. Air taken into the cylinders 33 is mixed with fuel injected from the injector 32 and then ignited by the ignition plug 36. In this manner, power is generated by the engine 7.

(3) Structure of Variable Valve Device

Now, the variable valve device 35 will be described.

FIG. 3 is a perspective view of the intake valve driving mechanism 353, FIGS. 4A, 4B, 5A and 5B are side views of the intake valve driving mechanism 353. FIGS. 4A and 5A show the state of the intake valve driving mechanism 353 when the lift degree of the intake valve 351 is minimized in one cycle, i.e., when the opening end 9a of the intake port 9 is closed by the intake valve 351. FIGS. 4B and 5B show the state of the intake valve driving mechanism 353 when the lift degree of the intake valve 351 is maximized in one cycle.

FIGS. 4A and 4B show the state of the intake valve driving mechanism 353 when the lift degree of the intake valve 351 is maximized by the variable valve device 35. FIGS. 5A and 5B show the state of the intake valve driving mechanism 353 when the lift degree of the intake valve 351 is minimized by the variable valve device 35.

As shown in FIGS. 3, 4A, 4B, 5A and 5B, the intake valve driving mechanism 353 includes a rotation cam 52, a swing cam 53, a fixed shaft 54, a return spring 55, a control arm 56, and a rocker arm 58. The rotation cam 52 is fixed to a camshaft 51. A valve spring 59 is provided around the intake valve 351.

The intake valve driving mechanism 353 is provided for each intake valve 351. Therefore, according to the present preferred embodiment, the engine 7 includes the same number of intake valve driving mechanisms 353 as intake valves 351. The rotation cam 52 of each intake valve driving mechanism 353 is fixed to the one common camshaft 51.

A cam portion 531 is provided at one end of the swing cam 53. The cam portion 531 has a lift surface 311 and a base circular surface 312. A roller 532 is rotatably provided so as to rotate about the center of the swing cam 53. The other end of the swing cam 53 is rotatably provided at the fixed shaft 54. The fixed shaft 54 is fixed to the cylinder head 37 (FIG. 2).

The return spring 55 is attached to the cylinder head 37 and the swing cam 53. The return spring 55 energizes the swing cam 53 in one rotation direction around the fixed shaft 54. In this way, the outer circumferential surface of the roller 532 and the outer circumferential surface of the rotation cam 52 are abutted against each other.

A roller 561 is rotatably provided at one end of the control arm 56. A shaft holder 562 having an approximately U-shaped section is provided at the other end of the control arm 56. As shown in FIGS. 4A, 4B, 5A, and 5B, a restriction member 563 is provided at the front end of the shaft holder 562.

As shown in FIGS. 3, 4A, 4B, 5A, and 5B, the rocker arm 58 includes a bottom portion 581 and side portions 582 and 583. A press-down portion 584 projecting downwardly is provided at one end of the bottom portion 581. The lower end of the press-down portion 584 abuts against the upper end of intake valve 351. A roller receiving surface 585 is provided on the upper surface of the bottom portion 581 on one end. The roller 561 of the control arm 56 is provided between the cam portion 531 of the swing cam 53 and the roller receiving surface 585 of the rocker arm 58.

The shaft holder 562 and the side portions 582 and 583 hold the control shaft 57. In the present preferred embodiment, one common control shaft 57 is preferably held by the shaft holder 562 and the side portions 582 and 583 of each intake valve driving mechanism 353.

The valve spring 59 energizes the intake valve 351 upwardly in the axial direction. In this way, the upper end of the intake valve 351 and the lower end of the press-down portion 584 are abutted against each other.

Figure 6:
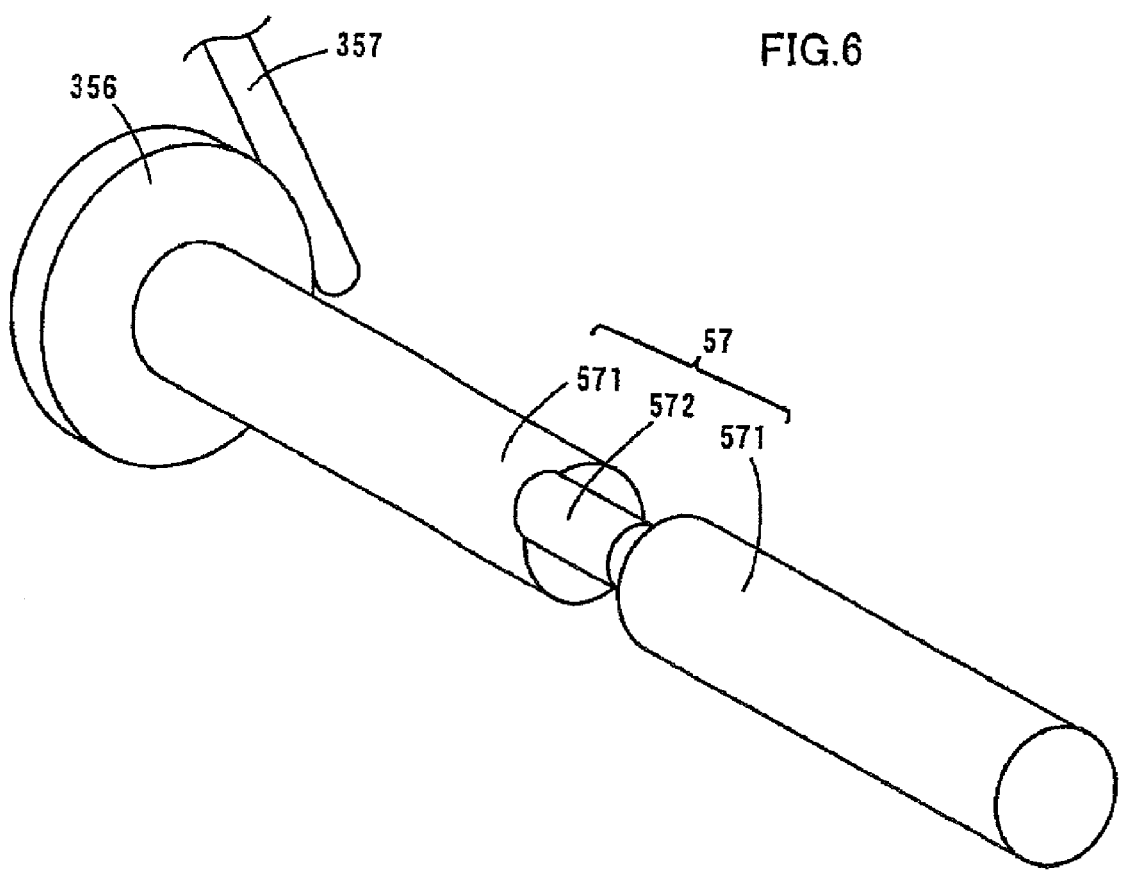
FIG. 6 is a perspective view of the general structure of the control shaft in FIGS. 2 and 3.

FIG. 6 is a schematic perspective view of the control shaft 57. As shown in FIG. 6, the control shaft 57 has large diameter portions 571 and a small diameter portion 572 that are integrally provided. The small diameter portion 572 is provided eccentrically with respect to the axial center of the large diameter portions 571. The large diameter portion 571 is rotatably held by the side portions 582 and 583 in FIGS. 3, 4A, 4B, 5A, and 5B, and the small diameter portion 572 is rotatably held by the shaft holder 562 and the restriction member 563 in FIGS. 3, 4A, 4B, 5A, and 5B. The worm wheel 356 is fixed in a predetermined position of the large diameter portion 571.

In this way, the rotation force of the crankshaft (not shown) of the engine 7 (FIG. 5) is transmitted to the camshaft 51 in FIGS. 3, 4A, 4B, 5A, and 5B through the chain (not shown). In this way, the rotation cam 52 rotates around the camshaft 51.

As the rotation cam 52 rotates, the swing cam 53 swings around the fixed shaft 54. The pivotal movement of the swing cam 53 allows the cam portion 531 of the swing cam 53 to swing. This moves the roller 561 up and down, so that the control arm 56 swings around the small diameter portion 572.

As the control arm 56 swings, the rocker arm 58 swings around the large diameter portions 571 and 573. As the rocker arm 58 swings, the press-down portion 584 moves up and down. This moves the intake valve 351 up and down. Consequently, the opening end 9a is opened/closed by the intake valve 351.

(4) Adjusting Lift Degree of Intake Valve

Now, a method of adjusting the lift degree of the intake valve 351 will be described.

According to the present preferred embodiment, as the rotation shaft 357 (FIG. 6) of the motor 355 (FIG. 2) rotates, the worm wheel 356 (FIG. 6) rotates, and the control shaft 57 rotates. At the time, the small diameter portion 572 (FIG. 6) moves on a circumference around the axial center of the large diameter portions 571, 573 (FIG. 6).

As shown in FIGS. 4A and 4B, when the small diameter portion 572 is in its closest position to the cam shaft 51, the contact point A moves between the boundary of the lift surface 311 and the base circular surface 312 and the vicinity of the front end of the lift surface 311.

As shown in FIGS. 5A and 5B, when the small diameter portion 572 is at its furthest position from the cam shaft 51, the contact point A moves between the vicinity of the front end of the base circular surface 312 and a prescribed position (approximate center of the cam portion 531) on the rear end side (on the side of the base circular surface 312) of the lift surface 311. More specifically, according to the present preferred embodiment, the moving range of the contact point A can be adjusted by changing the position of the small diameter portion 572.

Here, the base circular surface 312 is defined on a circumference around the axial center of the fixed shaft 54. Therefore, when the contact point A moves on the base circular surface 312, the roller 561 is not moved up and down.

On the other hand, the lift surface 311 is arranged so that its distance from the axial center of the fixed shaft 54 increases toward the front end. Therefore, when the contact point A moves on the lift surface 311, the amount that the roller 561 is pressed downward by the cam portion 531 increases as the contact point A approaches the front end of the lift surface 311.

Therefore, as shown in FIGS. 4A and 4B, when the contact point A moves from the boundary between the lift surface 311 and the base circular surface 312 to the vicinity of the front end of the lift surface 311, the vertical moving distance L1 of the roller 561 is sufficiently large. This allows the vertical moving distance L2 of the press-down portion 584 of the rocker arm 58 to be sufficiently large, so that the lift degree of the intake valve 351 increases.

On the other hand, as shown in FIGS. 5A and 5B, when the contact point A moves from the vicinity of the front end of the base circular surface 312 to a prescribed position on the rear end side of the lift surface 311, the vertical moving distance L1 of the roller 561 is reduced. The vertical moving distance L2 of the press-down portion 584 decreases accordingly, so that the lift degree of the intake valve 351 is reduced.

As in the foregoing, according to the present preferred embodiment, the motor 355 (FIG. 2) is used to adjust the position of the small diameter portion 572 and the moving range of the contact point A is adjusted, so that the lift degree of the intake valve 351 can be adjusted accordingly. More specifically, when the lift degree of the intake valve 351 is increased, the motor 355 is driven so that the moving range of the contact point A is moved to the front end side of the lift surface 311. When the lift degree of the intake valve 351 is reduced, the motor 355 is driven so that the moving range of the contact point A is moved to the front end side of the base circular surface 312.

Therefore, according to the present preferred embodiment, the amount of air taken into the engine 7 can readily be adjusted by controlling the motor 355. Consequently, the output of the engine 7 can easily be adjusted according to various conditions.

(5) Use of Brushless DC Motor

Figure 7:
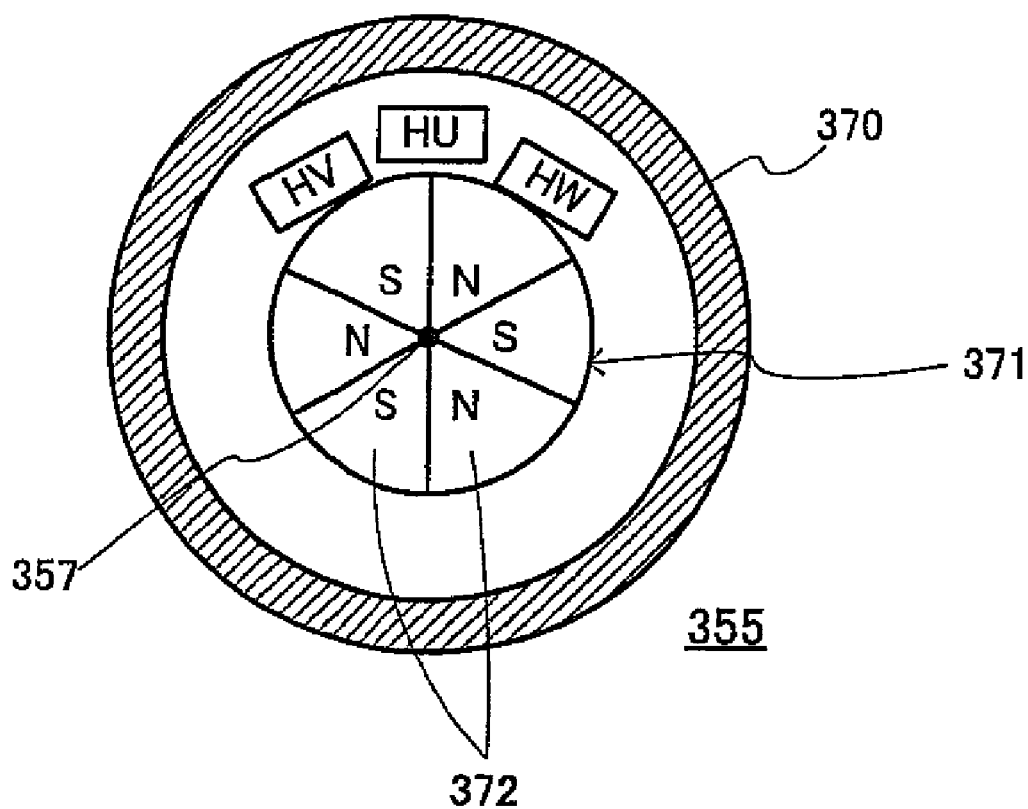
FIG. 7 is a cross-sectional view of the structure of the brushless DC motor in FIG. 2.

According to the present preferred embodiment, a well-known brushless DC motor, for example, is preferably used as the motor 355. Referring to FIG. 7, the brushless DC motor 355 generally includes a cylindrical box 370, a rotation shaft 357, a rotor 371 of a permanent magnet, a stator (not shown) of a driving coil, and magnetic pole sensors HU, HV, and HW. The rotor 371 is rotatably supported by the box 370 together with the rotation shaft 357. The brushless DC motor 355 preferably has three phases, i.e., U, V, and W phases, and the rotor 371 includes three permanent magnets and preferably has six magnetic poles 372, for example. The magnetic poles 372 are provided at every 60° of the rotor 371. The N and S poles are alternately arranged. Three magnetic pole sensors HU, HV, and HW are arranged around the rotor 371. The magnetic pole sensors HU, HV, and HW are provided every 30°, for example. In the brushless DC motor 355, the magnetic pole sensors HU, HV, and HW detect the position (rotation angle) of the rotor 371, and the stator defines a three-phase rotating magnetic field. This allows the rotor 371 to rotate. It is noted that while this preferred embodiment preferably includes three magnetic pole sensors, any desirable number of pole sensors could be used.

Figure 8:
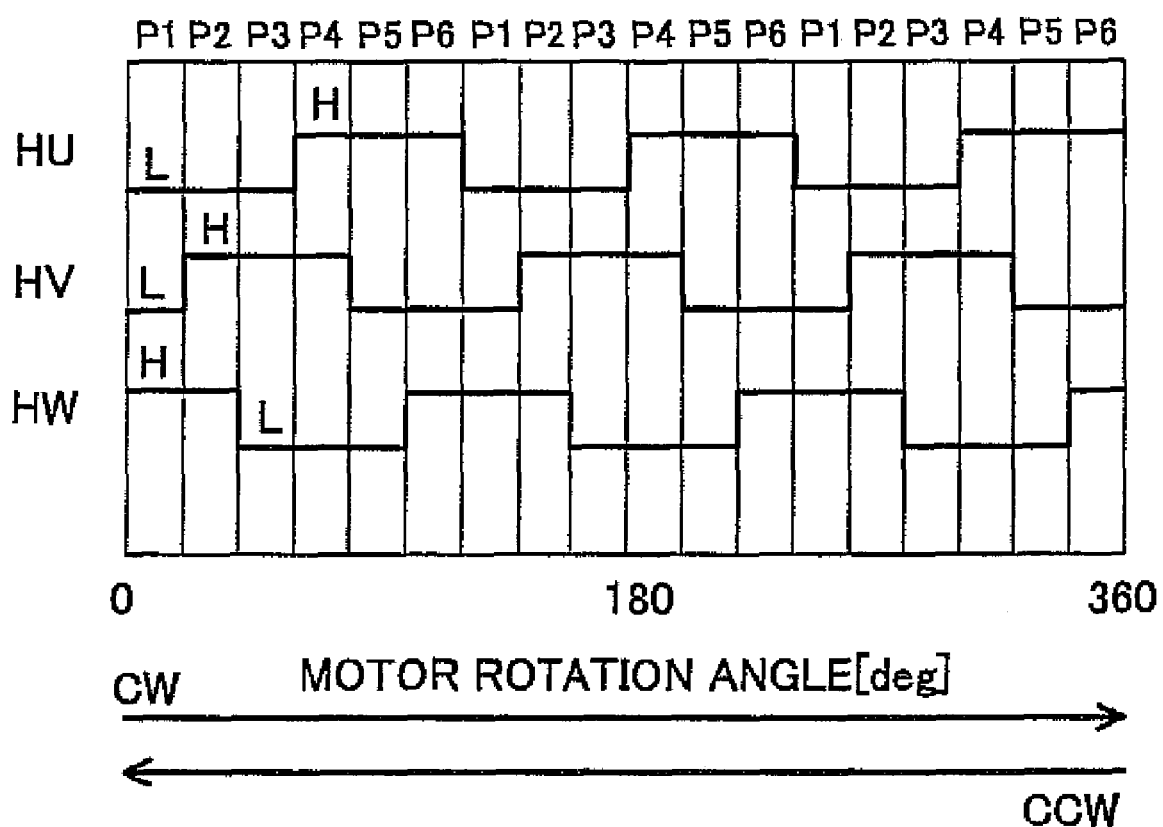
FIG. 8 is a timing chart showing the output signals of magnetic pole sensors in FIG. 7.

When the rotor 371 makes one rotation (360°), the magnetic pole sensors HU, HV, and HW output signals in waveforms shown in FIG. 8. The signals each have six pulse patterns P1 to P6 for each 120° as given in the following Table 1. When the magnetic pole pulse patterns are represented by binary notation and decimal notation, P1=001=1, P2=011=3, P3=010=2, P4=110=6, P5=100=4, and P6=101=5.

TABLE 1

| HU | HV | HW | Decimal | Magnetic pole pulse pattern |
|----|----|----|---------|-----------------------------|
| L  | L  | H  | 1       | P1 |
| L  | H  | H  | 3       | P2 |
| L  | H  | L  | 2       | P3 |
| H  | H  | L  | 6       | P4 |
| H  | L  | L  | 4       | P5 |
| H  | L  | H  | 5       | P6 |

When the motor 355 rotates clockwise (CW), the magnetic pole pulse pattern changes in the sequence of P1, P2, P3, P4, P5, and P6. On the other hand, when the motor 355 rotates counterclockwise (CCW), the magnetic pole pulse pattern changes in the sequence of P6, P5, P4, P3, P2 and P1.

(6) Structure of ECU

Now, the structure of the ECU 16 will be described. The ECU 16 adjusts the output of the engine 7 by the above-described method (by adjusting the position of the small diameter portion 572).

Figure 9:
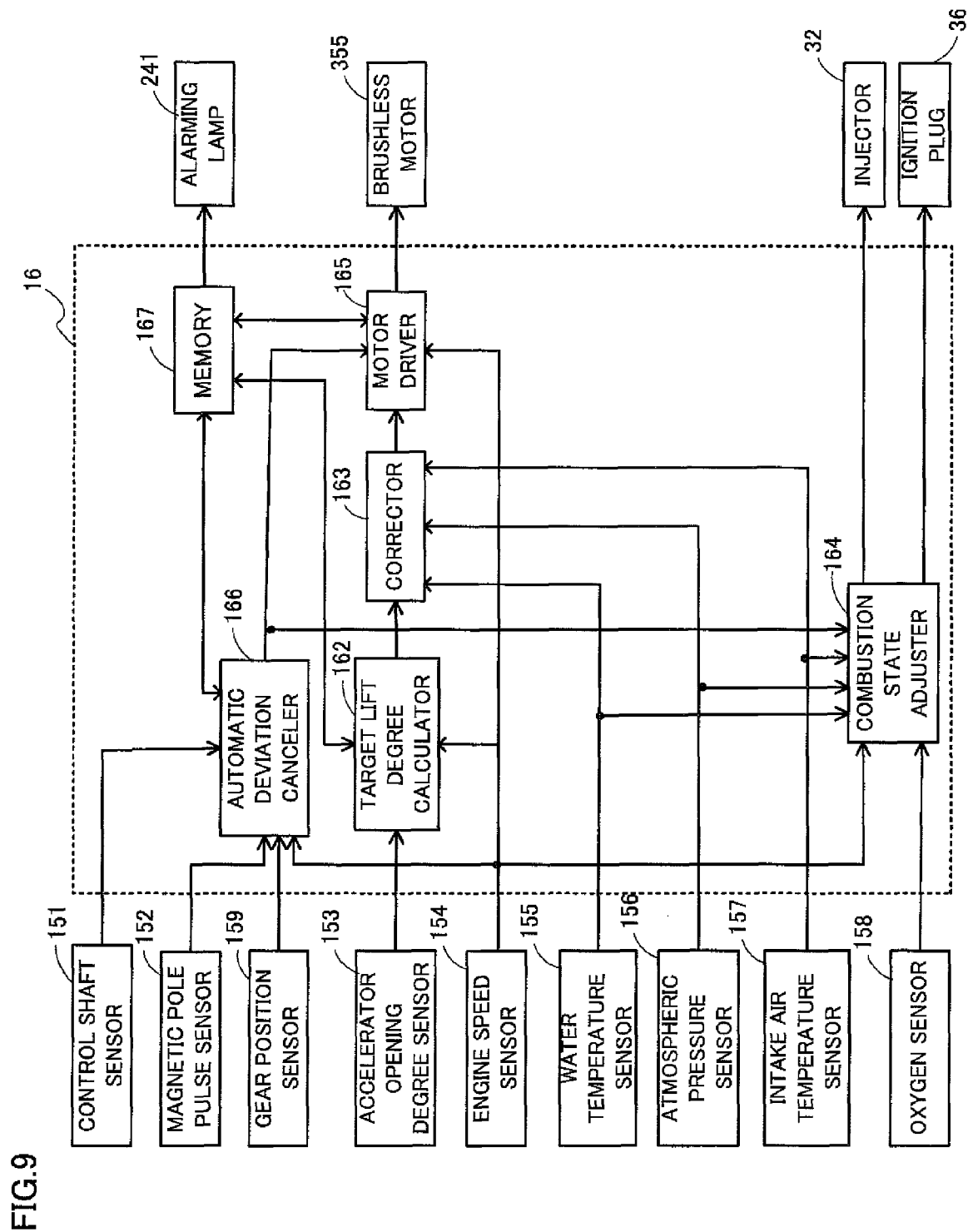
FIG. 9 is a functional block diagram showing the structure of the ECU and its periphery shown in FIG. 1.

FIG. 9 is a block diagram of the configuration of the ECU 16 and its periphery. As shown in FIG. 9, the input of the ECU 16 is connected with a control shaft sensor 151, magnetic pole sensors 152 (HU, HV, and HW in FIG. 7), a gear position sensor 159, an accelerator opening degree sensor 153, an engine speed sensor 154, a water temperature sensor 155, an atmospheric pressure sensor 156, an intake air temperature sensor 157, and an oxygen sensor 158. The output of the ECU 16 is connected with a brushless DC motor 355, an injector 32, and an ignition plug 36. The control shaft sensor 151 may be for example a potentiometer or a pulse encoder. The accelerator opening degree sensor 153 may be the same type of a device that is used for the control shaft sensor 151. The gear position sensor 159 may preferably be, for example, a sensor that detects the rotation angle of a shift cam or a device including a switch that is turned on in response to each gear position.

The ECU 16 includes a target lift degree calculator 162, a corrector 163, a motor driver 165, an automatic deviation canceller 166, a memory 167, and a combustion state adjuster 164.

The control shaft sensor 151 detects the rotation angle of the control shaft 57 and supplies the detected angle to the automatic deviation canceller 166. The magnetic pole sensors 152 detect magnetic poles 372 of the rotor 371 and apply output signals shown in FIG. 8 to the automatic deviation canceller 166. The gear position sensor 159 detects the gear position of the transmission and supplies it to the automatic deviation canceller 166. The accelerator opening degree sensor 153 detects the opening degree (accelerator opening degree) of the accelerator grip (not shown) provided at the handle 5 (FIG. 1) and supplies it to the target lift degree calculator 162. The engine speed sensor 154 detects the engine speed of the engine 7 (FIG. 1) and supplies it to the target lift degree calculator 162, the automatic deviation canceller 166, the motor driver 165, and the combustion state adjuster 164. The water temperature sensor 155 detects the temperature of cooling water for the engine 7 and supplies it to the corrector 163 and the combustion state adjuster 164. The atmospheric pressure sensor 156 detects atmospheric pressure and supplies it to the corrector 163 and the combustion state adjuster 164. The intake air temperature sensor 157 detects the temperature of air taken into the engine 7 (FIG. 1) and supplies it to the corrector 163 and the combustion state adjuster 164. The oxygen sensor 158 detects the oxygen concentration of exhaust gas discharged from the engine 7 and supplies it to the combustion state adjuster 164.

The memory 167 previously stores map information indicating the relationship among the accelerator opening degree, the engine speed of the engine 7 and the lift degree of the intake valve 351. The target lift degree calculator 162 calculates a target lift degree for the intake valve 351 based on the output of the accelerator opening degree sensor 153, the output of the engine speed sensor 154, and the map information stored in the memory 167.

The corrector 163 corrects the target lift degree based on the outputs of the water temperature sensor 155, the atmospheric pressure sensor 156, the intake air temperature sensor 157, and various other sensors.

The automatic deviation canceller 166 automatically cancels a deviation in the relationship between the rotation amount of the control shaft 57 and the lift degree of the intake valve 351 caused by the disassembling and reassembling of the engine 7. The automatic deviation canceller 166 also calculates the actual rotation amount of the control shaft 57 (the rotation amount from the reference angle, in other words, the difference between the detected rotation angle and the reference angle) based on the rotation angle detected by the control shaft sensor 151 and the reference angle (such as the rotation angle of the control shaft 57 when the lift degree of the intake valve 351 is minimized) and supplies the calculation result to the motor driver 165 and the combustion state adjuster 164. The reference angle is stored in advance in the memory 167.

The memory 167 stores in advance conversion information used to convert the lift degree of the intake valve 351 into a corresponding rotation amount (a rotation amount from the reference angle) of the control shaft 57. The motor driver 165 converts the target lift degree corrected by the corrector 163 into a corresponding target rotation amount of the control shaft 57 based on the conversion information stored in the memory 167. The motor driver 165 compares the actual rotation amount of the control shaft 57 to the target rotation amount and supplies a command value to the motor 355 until the actual rotation amount reaches the target rotation amount. In this way, the motor 355 is driven and the small diameter portion 572 (FIG. 6) is moved to a prescribed position. As a result, the intake valve 351 is opened/closed with the target lift degree.

The combustion state adjuster 164 determines the injection amount and the injection timing of fuel injected from the injector 32 and the ignition timing of air-fuel mixture by the ignition plug 36 based on the actual rotation amount of the control shaft supplied from the automatic deviation canceller 166 and the outputs of the water temperature sensor 155, the atmospheric pressure sensor 156, the intake air temperature sensor 157, the oxygen sensor 158 and various other sensors. The combustion state adjuster 164 controls the injection of fuel by the injector 32 based on the determined injection amount and injection timing and controls the ignition of air-fuel mixture by the ignition plug 36 based on the determined ignition timing.

Normal Control Operation by ECU

Now, normal control operation by the ECU 16 will be described in detail.

Figure 10:
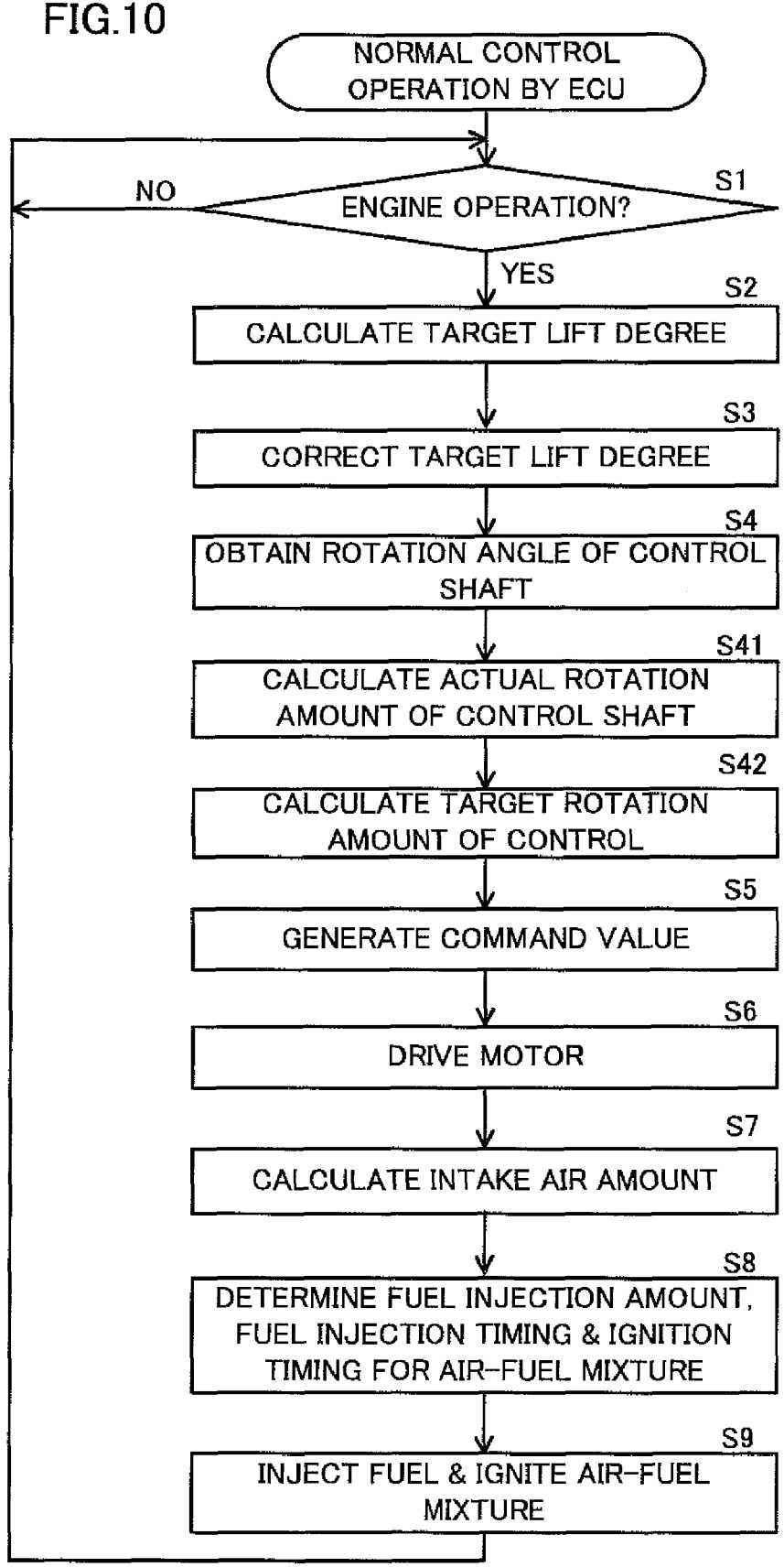
FIG. 10 is a flowchart showing a normal control operation of the ECU shown in FIG. 9.

Referring to FIG. 10, the target lift degree calculator 162 determines whether the engine 7 is operating based on the output of the engine speed sensor 154 (S1). If the engine 7 is operating (YES in S1, the target lift degree calculator 162 calculates a target lift degree for the intake valve 351 based on the outputs of the accelerator opening degree sensor 153 and the engine speed sensor 154 and the map information stored in the memory 167 (S2). If the engine 7 is not operating (NO in S1, the target lift degree calculator 162 stands by until the engine 7 operates.

The corrector 163 then corrects the target lift degree calculated in step S2 based on the outputs of the water temperature sensor 155, the atmospheric pressure sensor 156 and the intake air temperature sensor 157 (S3).

The automatic deviation canceller 166 obtains the rotation angle of the control shaft 57 detected by the control shaft sensor 151 (S4).

The automatic deviation canceller 166 then calculates the actual rotation amount based on the rotation angle obtained in step S4 and the reference angle stored in the memory 167 and supplies the calculated amount to the motor driver 165 (S41). The motor driver 165 calculates a target rotation amount of the control shaft 57 based on the target lift degree corrected in step S3 and the conversion information stored in the memory 167 (S42). The motor driver 165 generates a command value to the motor 355 so that the actual rotation amount equals the target rotation amount (S5). The motor driver 165 drives the motor 355 based on the command value generated in step S5 (S6).

Then, the fuel combustion state adjuster 164 calculates the amounts of air taken into the four cylinders 33 in the engine 7 based on the rotation amount of the control shaft 57 calculated in step S41 (i.e., the lift degree of the intake valve) and the engine speed of the engine 7 detected by the engine speed sensor 154 (S7).

Then, the combustion state adjuster 164 determines the injection amount and ignition timing of fuel to be injected by the injector 32 and the ignition timing of air-fuel mixture by the ignition plug 36 based on the intake air amounts for the cylinders 33 calculated in step S7, and the outputs of the water temperature sensor 155, the atmospheric pressure sensor 156, the intake air temperature sensor 157, the oxygen sensor 158, and various other sensors (S8).

Finally, the combustion state adjuster 164 controls the injection of fuel by the injector 32 based on the determined injection amount and the injection timing determined in step S8 and controls the ignition of air-fuel mixture by the ignition plug 36 based on the ignition timing determined in step S8 (S9). Then, the process returns to step S1.

(8) Checking Operation by ECU

Figure 11:
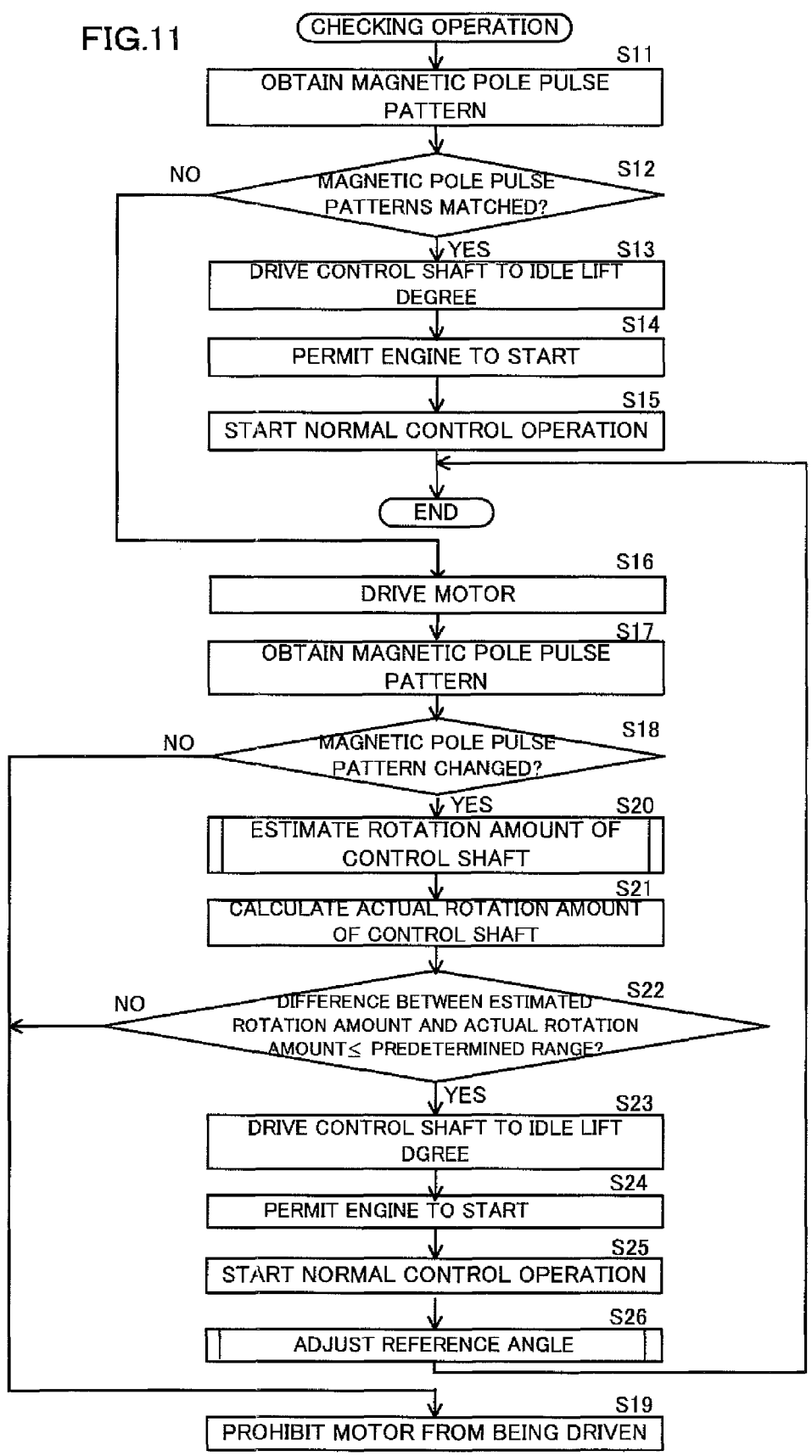

Now, referring to FIG. 11, the operation of checking whether the engine 7 has been disassembled and assembled will be described. When the main switch is turned on and yet the starter motor is not rotated, the ECU 16 is activated but the engine 7 is not yet started. At the time, the automatic deviation canceller 166 obtains a magnetic pole pulse pattern from the magnetic pole sensors 152 (S11). The automatic deviation canceller 166 compares the obtained magnetic pole pulse pattern to the magnetic pole pulse pattern stored in the memory 167 after the engine 7 stops in step S39 that will be described and determines whether the difference between them is within a predetermined range (S12). Unless the engine 7 is disassembled and reassembled between the previous stopping and the present start of the engine 7, no deviation is generated in the relationship between the rotation angle of the control shaft 57 and the lift degree of the intake valve 351, so that the magnetic pole pulse pattern must match or the difference between them must fall within a predetermined range.

The rotation angle of the control shaft 57 may be used in place of the magnetic pole pulse pattern. In this case, the rotation angle of the control shaft 57 is obtained from the control shaft sensor 151 before the engine 7 starts, this rotation angle is compared to the rotation angle obtained after the engine 7 stops, and it is determined whether the difference between them is within the predetermined range. In short, the information needs only to be information that is necessary for specifying the rotation angle of the control shaft 57.

If the determination is carried out using the magnetic pole pulse pattern, it is only necessary to determine whether the magnetic pole pulse patterns match, for example. If the rotation angle or the rotation amount is used for the determination, it is only necessary to determine whether the rotation angle or the rotation amount is within a range of ±0.82°, for example.

If the difference between the magnetic pole pulse patterns is within a predetermined range (YES in S12), it is determined that the engine 7 has not been disassembled and assembled and the motor driver 165 drives the control shaft 57 so that the intake valve is driven with a predetermined idle lift degree (S13). The idle lift degree is a lift degree in an idling state that is necessary for starting the engine 7. More specifically, the motor driver 165 drives the motor 355 based on a predetermined idle rotation amount as the above-described target rotation amount. The predetermined idle rotation amount is the rotation amount of the control shaft 57 when the lift degree of the intake valve equals the above-described idle lift degree. The motor driver 165 may drive the motor 355 so that the detection result of the control shaft sensor 151 equals a predetermined idle angle. The predetermined idle angle is the rotation angle of the control shaft 57 when the lift degree of the intake valve equals the above-described idle lift degree.

Then, the automatic deviation canceller 166 permits the engine 7 to start (S14) and starts the normal control operation shown in FIG. 10 (S15). The ECU 16 then ends the checking operation.

Meanwhile, If the magnetic pole patterns do not match (NO in S12), the automatic deviation canceller 166 determines whether this has been caused by the disassembling and assembling of the engine 7 or a damage or failure. More specifically, the automatic deviation canceller 166 attempts to drive the motor 355 only a little (S16), or attempts to drive the motor 355 for at least a predetermined period (such as about 200 milliseconds, for example) or for at least a predetermined rotation amount (such as about 5°, for example), for example. The predetermined period or rotation amount is stored in advance in the memory 167. The magnetic pole pulse pattern changes while the predetermined period or rotation amount is predetermined in the range in which a worm gear including a rotation shaft 357 and a worm wheel 356 is not damaged. Alternatively, the motor 355 may be driven at such a low speed (such as about 10°/sec, for example) that the worm gear is not damaged.

Figure 12:
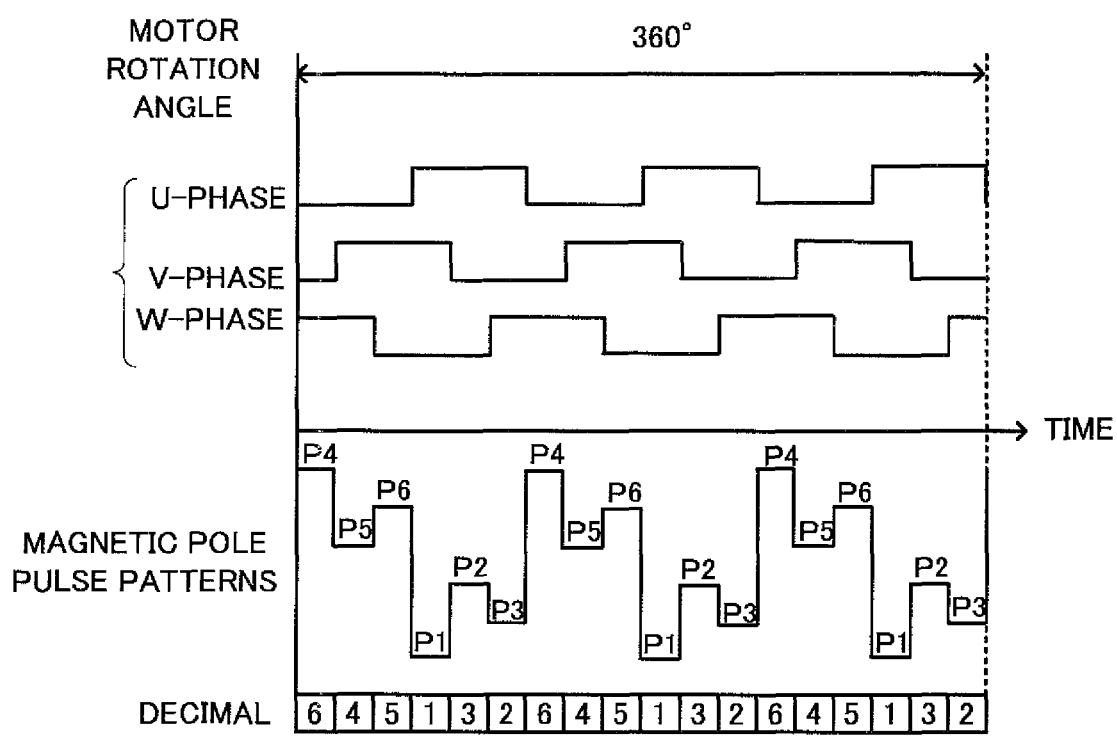
FIG. 12 is a timing chart showing the output signals of the magnetic pole sensors in FIG. 9 and an example of the magnetic pole pulse patterns.

Then, the automatic deviation canceller 166 obtains magnetic pole pulse patterns P1 to P6 from the magnetic pole sensors 152 (S17). An example of the output signals of the magnetic pole pulse sensors 152 and the magnetic pole pulse patterns corresponding to the signals is shown in FIG. 12.

When the motor 355 rotates clockwise, the magnetic pole pulse pattern repeatedly changes in the sequence of P1, P2, P3, P4, P5, and P6.

The automatic deviation canceller 166 then determines whether the magnetic pole pulse pattern detected by the magnetic pole pulse sensors 152 is changed (S18). If the magnetic pole pulse pattern is not changed regardless of the driving of the motor 355 to change the magnetic pole pulse pattern (No in S18), it is determined that the motor 355 or the magnetic pole sensors 152 have experienced a failure, and the automatic deviation canceller 166 prohibits the motor 355 from being driven.

On the other hand, if the magnetic pole pulse pattern is changed (YES in S18), it is determined that the motor 355 is normally operating, and the automatic deviation canceller 166 determines whether the rotation amount of the control shaft 57 can correctly be estimated (S20 to S22).

More specifically, the automatic deviation canceller 166 carries out predetermined processing for estimating a rotation amount of control shaft (S20). More specifically, the automatic deviation canceller 166 calculates an estimated rotation amount of the control shaft 57 based on the outputs of the magnetic pole pulse sensors 152, details of which will be described in the following paragraphs.

The automatic deviation canceller 166 calculates the actual rotation amount based on the rotation angle of the control shaft 57 detected by the control shaft sensor 151 and the reference angle (S21).

The automatic deviation canceller 166 then determines whether the difference between the estimated rotation amount calculated in step S20 and the actual rotation amount calculated in step S21 is within a predetermined range (S22). If the difference is not within the predetermined range (NO in S22), it is determined that the variable valve device 35 such as the control shaft sensor 151 has a failure, and the automatic deviation canceller 166 prohibits the motor 355 from being driven (S19). On the other hand, if the difference is within the predetermined range (YES in S22), it is determined the inconsistency of the magnetic pole pulse patterns has been caused by the disassembling and assembling of the engine 7, and the motor driver 165 rotates the control shaft 57 by driving the motor 355 so that the intake valve is driven with the predetermined idle lift degree (S23). More specifically, the motor driver 165 sets the target rotation amount to the predetermined idle rotation amount. Alternatively, the motor driver 165 sets the rotation angle of the control shaft 57 to the predetermined idle angle.

Here, the control shaft 57 is rotated within the range in which the worm gear is not damaged. Then, in order to surely carry out the processing for adjusting reference angle, that will be described, the automatic deviation canceller 166 may control the motor driver 165 to forcibly set the target lift degree to the predetermined idle lift degree regardless of the accelerator opening degree and the engine speed. In this case, even if the accelerator is operated, the target lift degree remains unchanged until the processing for adjusting reference angle (S26) ends.

If the magnetic pole pulse patterns do not match (NO in S12), it may be deemed that the system has not experienced an abnormality, and the process may skip steps 16 to S22 and directly proceed to step S23.

After the control shaft 57 is driven to the idle lift degree, the automatic deviation canceller 166 permits the engine 7 to start (S24) and the normal control operation shown in FIG. 10 is started (S25). The automatic deviation canceller 166 carries out predetermined reference angle adjusting processing (S26). More specifically, the automatic deviation canceller 166 automatically determines the rotation angle of the control shaft 57 when the lift degree is minimized and stores the angle as the reference angle in the memory 167, details of which will be described in the following paragraphs. The ECU 16 then ends the checking operation.

(9) Processing for Estimating Rotation Angle of Control Shaft

Now, the processing for estimating the rotation angle of the control shaft in step S20 will be described in detail.

Figure 13:
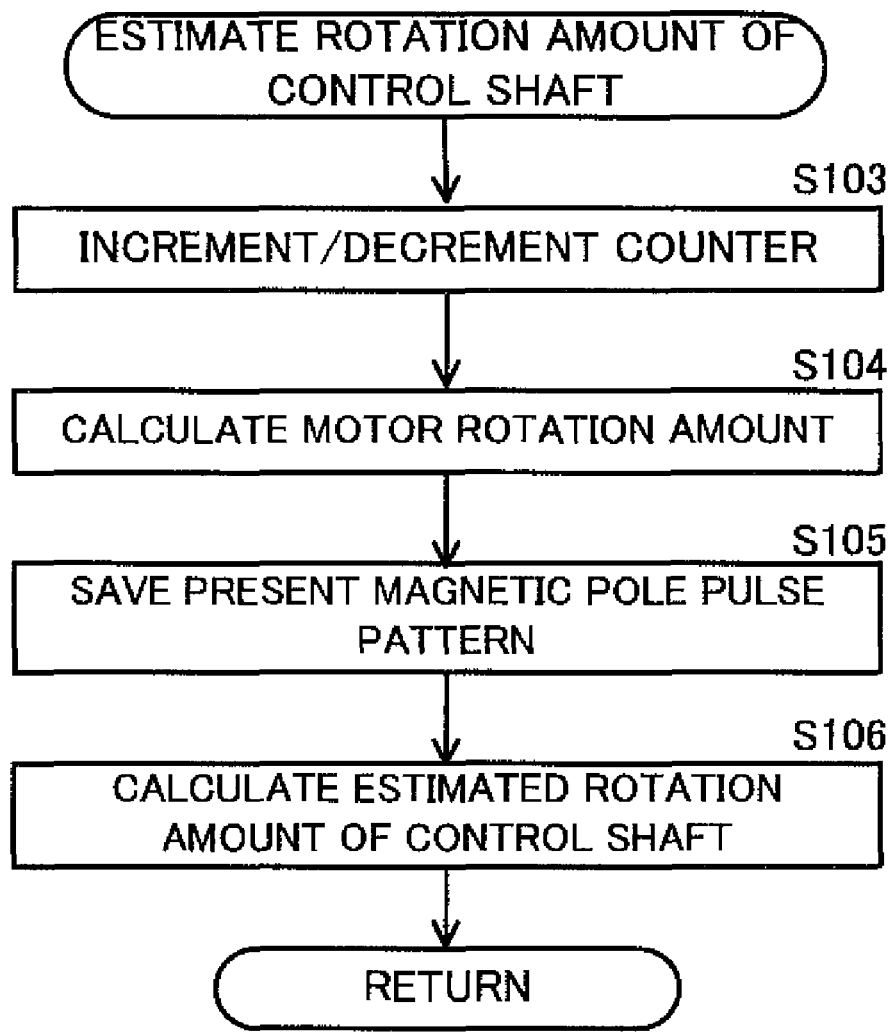
FIG. 13 is a flow chart showing the process of estimating the rotation amount of the control shaft in FIG. 11.
Figure 14:
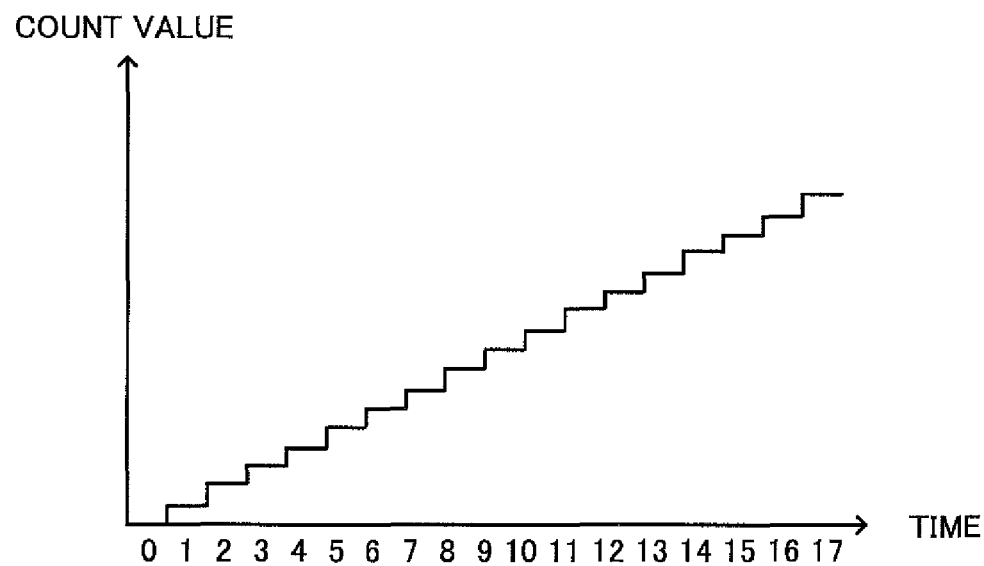
FIG. 14 is a timing chart showing an example of a count value counted by a rotation amount counter in the process of estimating the rotation amount of the control shaft in FIG. 13.
Figure 15:
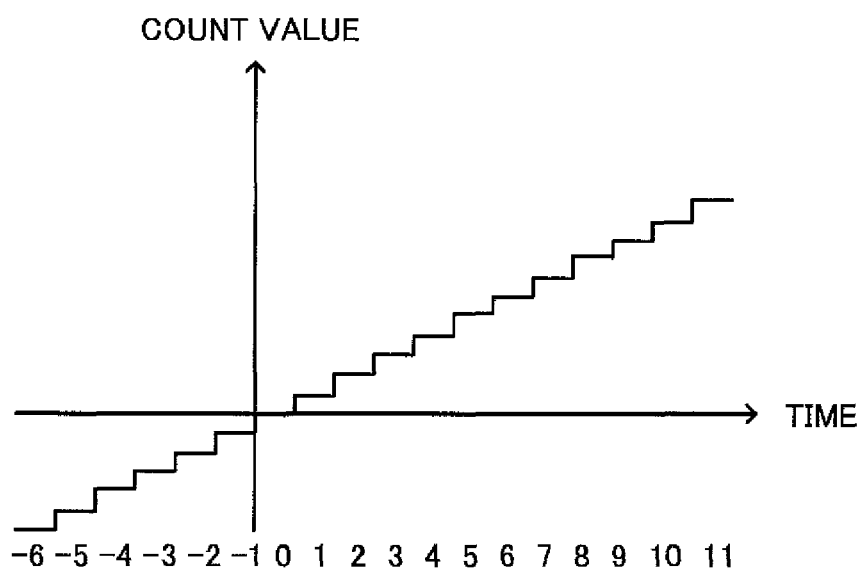
FIG. 15 is a timing chart showing another example of a count value counted by the rotation amount counter in the process of estimating the rotation amount of the control shaft in FIG. 13.

Referring to FIG. 13, the automatic deviation canceller 166 increments or decrements the rotation amount counter (a parameter that is set to count the rotation amount of the motor 355) (S103). More specifically, when it is determined in step S18 that the magnetic pole pulse patterns P1 to P6 have changed clockwise, the rotation amount counter is incremented by the difference between the magnetic pole pulse pattern obtained in step S11 and the magnetic pole pulse pattern obtained in steps S17. If it is determined in step S18 that the magnetic pole pulse patterns P1 to P6 have changed counterclockwise, the rotation amount counter is decremented. When the motor 355 rotates clockwise, the value of the rotation amount counter is incremented by one as shown in FIG. 14. In the example shown in FIG. 14, when the throttle is fully closed, the rotation amount counter is set to an initial value "0." Note however that the rotation amount counter may be set to "0" when the throttle is half-open as in the example shown in FIG. 15.

The automatic deviation canceller 166 then calculates the rotation amount of the motor 355 based on the value of the rotation amount counter (S104). As shown in FIG. 8, there are preferably six magnetic pole pulse patterns P1 to P6 at intervals of 120°, and therefore the motor 355 is rotated by 20° for each magnetic pole pulse pattern. Therefore, the rotation amount of the motor 355 is calculated by the following Expression (1):

$$\text{Motor rotation amount} = 20° \times \text{count value} \quad (1)$$

The automatic deviation canceller 166 then saves the presently obtained magnetic pole pulse pattern in the memory 167 (S105). The magnetic pole pulse pattern saved here is used to determine whether the magnetic pole pulse pattern is changed in step S102 next time and, if changed, determine whether the rotation direction of the motor 355 is clockwise or counterclockwise.

Finally, the automatic deviation canceller 166 calculates an estimated rotation amount of the control shaft 57 based on the rotation amount of the motor 355 (S106). When the worm gear ratio of the rotation shaft 357 of the motor 355 and the control shaft 57 is 2:49, the control shaft 57 rotates by about $0.82° (=20° \times (2/49))$ for one magnetic pole pulse pattern. Therefore, the estimated rotation amount of the control shaft 57 can be calculated by the following Expression (2):

$$\text{Estimated rotation amount of control shaft} = 0.82° \times \text{count value} \quad (2)$$

In this way, the rotation angle of the control shaft when the main switch is turned on can be estimated.

(10) Processing for Adjusting Reference Angle

Now, the processing for adjusting reference angle in step S26 will be described in detail.

Figure 16:
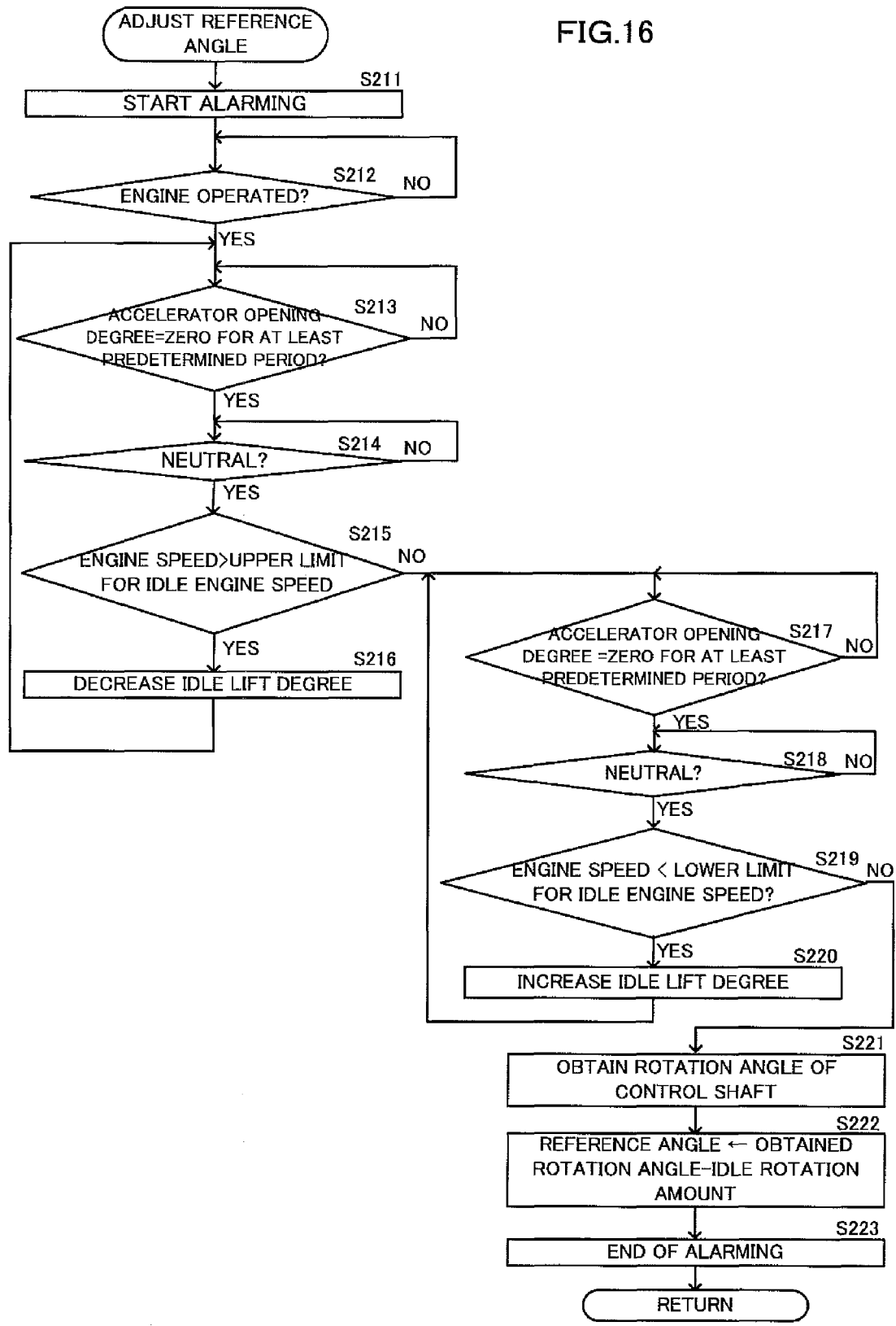
FIG. 16 is a flowchart showing the process of adjusting the reference angle in FIG. 11.
Figure 17:
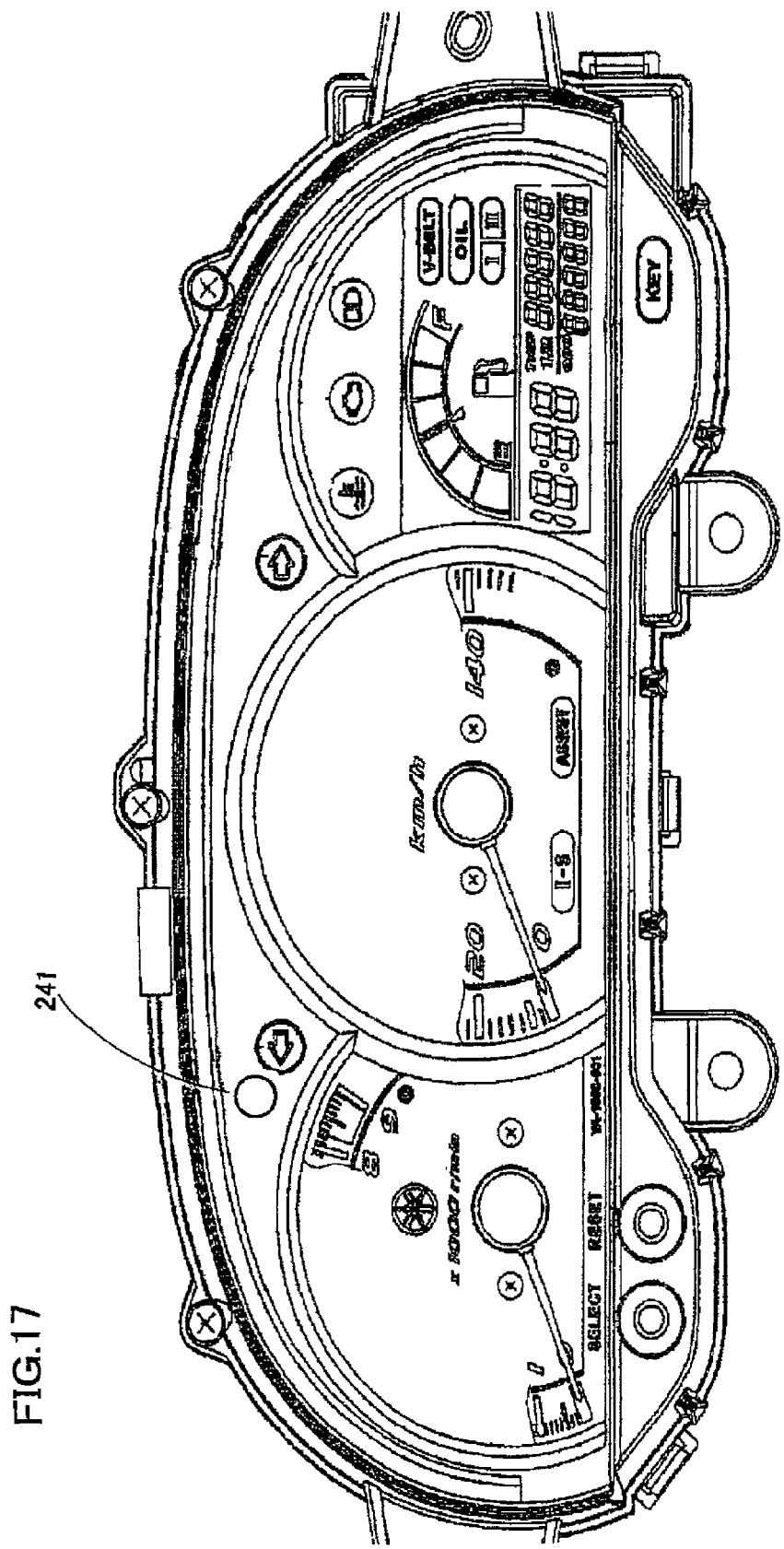
FIG. 17 is a front view of the meter panel of the motorcycle shown in FIG. 1.

Referring to FIG. 16, the automatic deviation canceller 166 starts to warn the driver not to operate a transmission during the processing (S211). More specifically, as shown in FIG. 17, an alarming lamp 241 provided at the meter panel 24 is lighted up. A display may be provided instead of or together with the alarming lamp 241 so that a message may be indicated or a buzzer may be rung to warn the driver.

The automatic deviation canceller 166 then determines whether the engine 7 is operating based on the output of the engine speed sensor 154 (S212). If the engine 7 is not operating (NO in S212), the automatic deviation canceller 166 stands by until the engine 7 operates.

If the engine 7 is operating (YES in S212), the automatic deviation canceller 166 determines whether the accelerator has been operated based on the output of the accelerator opening degree sensor 153. More specifically, the automatic deviation canceller 166 determines whether the opening degree of the accelerator is zero for at least a predetermined period (S213). Even after the accelerator is rotated and the engine speed increases, the engine speed becomes stable at the predetermined idle rotation speed if the accelerator is returned to the original position, the accelerator opening degree becomes zero, and a predetermined period or more elapses.

If the opening degree of the accelerator is zero for at least the predetermined period (YES in S213), the automatic deviation canceller 166 determines whether the gear position of the transmission is neutral based on the output of the gear position sensor 159 (S214). If the gear position of the transmission is not neutral (NO in S214), the automatic deviation canceller 166 stands by until the gear position of the transmission becomes neutral.

If the gear position of the transmission is neutral (YES in S214), the automatic deviation canceller 166 calculates the present engine speed based on the output of the engine speed sensor 154 and determines whether the present engine speed is higher than the upper limit for the idle engine speed (S215). The idle engine speed is a standard engine speed in an idling state and determined in advance. A predetermined tolerance range is set for the idle engine speed. More specifically, the upper limit and the lower limit are set. The upper and lower limits for the idle engine speed are stored in advance in the memory 167.

If the present engine speed is higher than the upper limit for the target idle engine speed (YES in S215), the automatic deviation canceller 166 controls the motor driver 165, and drives the motor 355 to rotate the control shaft 57 so that the idle lift degree is reduced (S216). Then, the process returns to step S213.

On the other hand, if the present engine speed is not higher than the upper limit for the idle engine speed (NO in S215), the automatic deviation canceller 166 determines whether the opening degree of the accelerator is zero for at least a predetermined period (S217). If the opening degree of the accelerator is zero for at least the predetermined period (YES in S217), the automatic deviation canceller 166 determines whether the gear position of the transmission is neutral based on the output of the gear position sensor 159 (S218). If the gear position of the transmission is not neutral (NO in S218), the automatic deviation canceller 166 stands by until the gear position of the transmission becomes neutral.

If the gear position of the transmission is neutral (YES in S218), the automatic deviation canceller 166 calculates the engine speed of the engine 7 based on the output of the engine speed sensor 154 and determines whether the present engine speed is lower than the lower limit for the target idle engine speed (S219).

If the present engine speed is lower than the lower limit for the target idle engine speed (YES in S219), the automatic deviation canceller 166 controls the motor driver 165 and drives the motor 355 to rotate the control shaft 57 so that idle lift degree increases (S220). The process then returns to step S217.

On the other hand, if the present engine speed is not lower than the lower limit for the idle engine speed (NO in S219), the automatic deviation canceller 166 obtains the rotation angle of the control shaft 57 from the control shaft sensor 151 (S221).

In short, in steps S215, S216, S219, and S220, the automatic deviation canceller 166 changes the lift degree so that the engine speed is within the tolerance range of the idle speed engine.

The automatic deviation canceller 166 then subtracts an idle rotation amount corresponding to the idle lift degree from the obtained rotation angle of the control shaft 57 and calculates a new reference angle (S222). The automatic deviation canceller 166 saves the newly calculated reference angle in the memory 167. In this case, when the lift degree of the control shaft 57 is minimized, the lift degree corresponds to the adjustment lift degree, and the reference angle at the time corresponds to the adjustment angle. The automatic deviation canceller 166 newly calculates an idle angle based on the newly calculated reference angle (reference angle+predetermined rotation amount), and saves the calculation result in the memory 167. In this case, the idle lift degree corresponds to the adjustment lift degree and the idle angle corresponds to the adjustment angle.

Finally, the automatic deviation canceller 166 ends the alarming operation started in step S211 (S223). More specifically, the alarming lamp 241 at the meter panel 24 shown in FIG. 17 is turned off.

Through the above-described processing, the reference angle of the control shaft 57 is updated and the deviation generated in the relationship between the rotation amount of the control shaft 57 and the lift degree of the intake valve 351 is cancelled.

(11) Control Operation by ECU When Power Supply is Off

Figure 18:
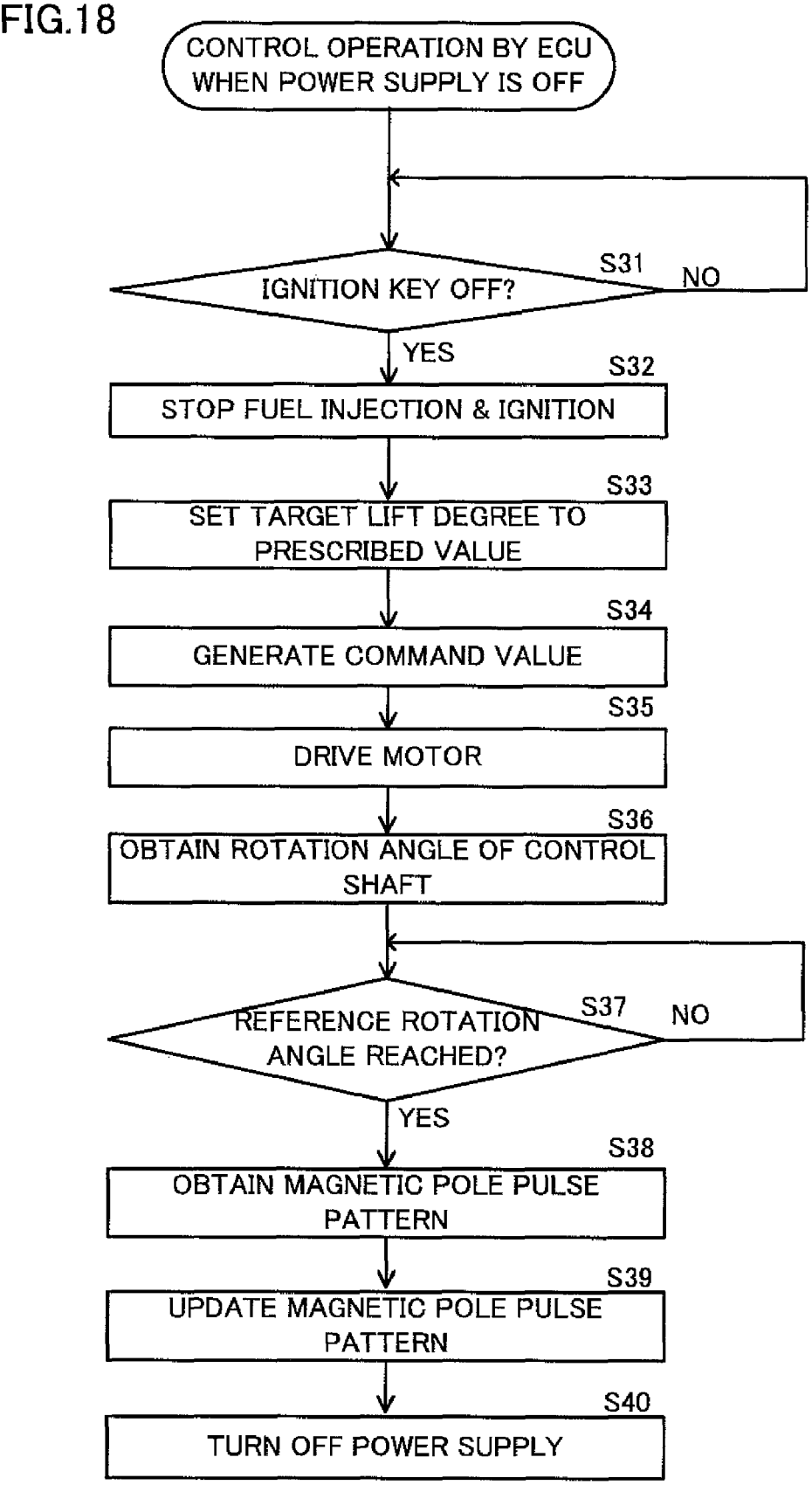
FIG. 18 is a flowchart showing the control operation carried out by the ECU shown in FIG. 9 when the power supply is off.

Referring to FIG. 18, the combustion state adjuster 164 determines whether the ignition key (not shown) is turned off (S31). If the ignition key is off (YES in S31), the combustion state adjuster 164 stops the fuel injection control and the ignition control (S32).

The motor driver 165 then sets a target lift degree to a predetermined value regardless of the accelerator opening degree and the engine speed (S33). The predetermined value is the minimized lift degree of the intake valve 351 when the rotation angle of the control shaft 57 becomes an updated reference angle in step S222.

The motor driver 165 then generates a command value to the motor 355 (S34) and drives the motor 355 based on the command value.

Then, the automatic deviation canceller 166 obtains the rotation angle of the control shaft 57 from the control shaft sensor 151 (S36). The motor driver 165 compares the obtained rotation angle to the above-described reference angle and drives the motor 355 to rotate the control shaft 57 until the rotation angle of the control shaft 57 reaches the reference angle (S37).

When the rotation angle of the control shaft 57 reaches the reference angle and the life degree of the intake valve 351 is minimized (YES in S37), the automatic deviation canceller 166 obtains the magnetic pole pulse pattern from the magnetic pole sensors 152 (S38) and saves the obtained pattern in the memory 167 that stores the previous magnetic pole pattern (S39).

Finally, the ECU 16 turns off by itself (S40).

Figure 19:
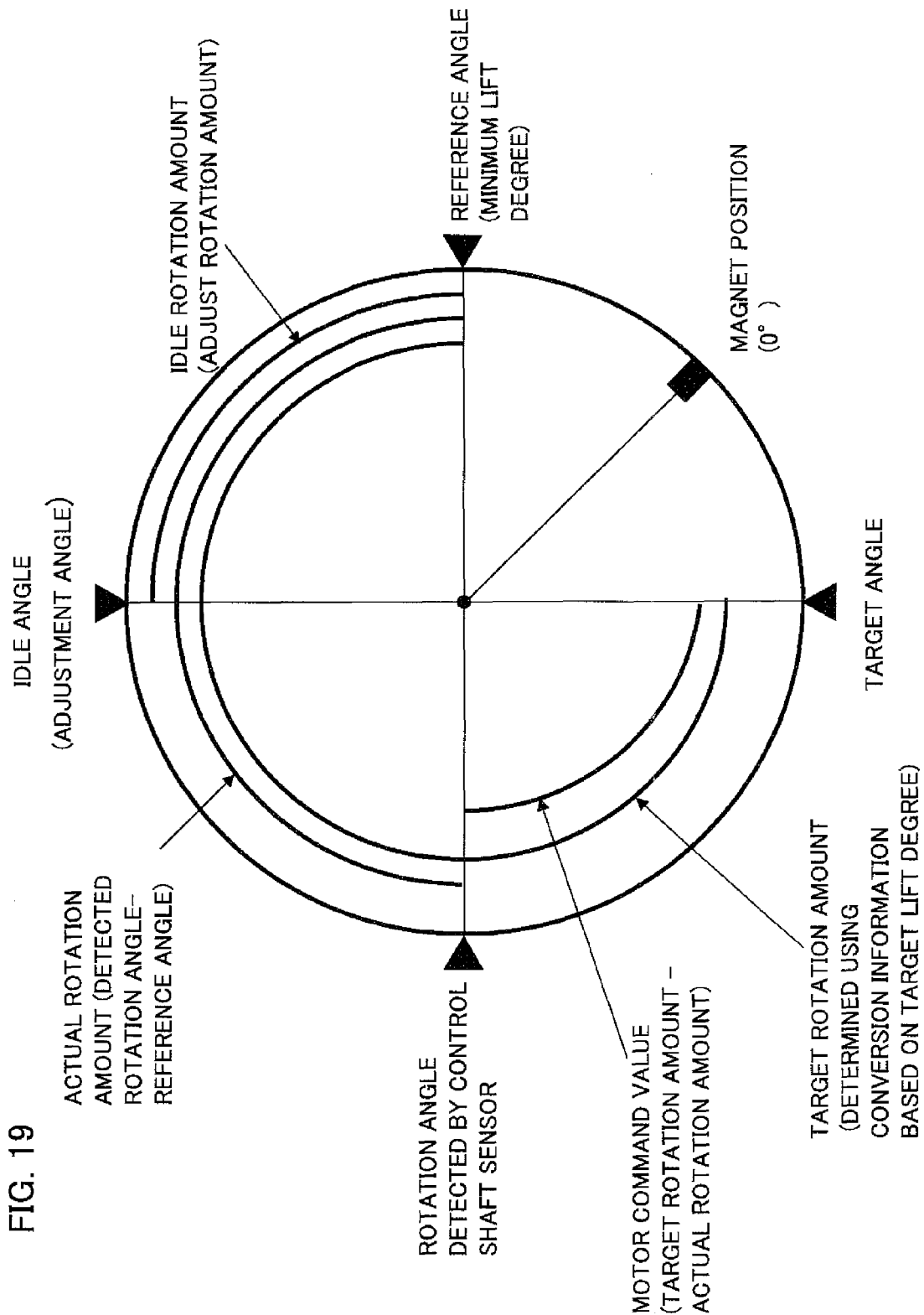
FIG. 19 is a view showing the relationships among the reference angle, the idle rotation amount (adjustment rotation amount), the idle angle (adjustment angle), the actual rotation amount, the rotation angle detected by the control shaft sensor, the motor command value, the target rotation amount, and the target angle.

The relationship among the reference angle, the idle rotation amount (adjustment rotation amount), the idle angle (adjustment angle), the actual rotation amount, the rotation angle detected by the control shaft sensor 151, the motor command value, the target rotation amount, and the target angle described above is shown in FIG. 19.

The target lift degree calculator 162, the corrector 163, the combustion state adjuster 164, a portion of the motor driver 165, and the automatic deviation canceller 166 shown in FIG. 9 may be implemented by a CPU (Central Processing Unit) and programs, and these components may be implemented in part or entirely by hardware such as electronic circuits.

As described above, according to a preferred embodiment of the invention, the magnetic pole pulse pattern of the brushless DC motor 355 preferably is obtained before the engine 7 starts, and if the magnetic pole pulse pattern does not match the magnetic pole pulse pattern stored after the last time the engine 7 was stopped, the idle rotation amount is changed. Therefore, if the engine 7 is disassembled and re-assembled and the magnetic pole pulse pattern has been changed during the period between the last stopping of the engine 7 and the present start of the engine 7, the engine 7 can normally be operated.

In addition, if the magnetic pole pulse pattern obtained before the present start of the engine 7 does not match the magnetic pole pulse pattern stored after the previous stopping of the engine 7, a predetermined idle lift degree is set, the idle lift degree is changed so that the engine speed is within the tolerance range of the idle engine speed, the rotation amount corresponding to the idle lift degree is subtracted from the rotation amount of the control shaft 57 obtained after the change, and the reference angle is updated by the difference. Therefore, if there is a deviation in the relationship between the lift degree and the rotation amount because of the disassembling and assembling of the engine 7, the deviation can automatically be cancelled.

Furthermore, when the gear position of the transmission is neutral, the idle lift degree is changed, so that the reference angle can correctly be updated.

Furthermore, during the period in which the idle lift degree is changed and the deviation caused in the relationship between the lift degree and the rotation amount is automatically cancelled, the driver is notified of the state, and therefore the driver can be warned by the alarm not to change the gear position of the transmission.

According to the above-described preferred embodiment, the rotation amount of the control shaft 57 is preferably set to a predetermined idle rotation amount in order to automatically cancel a deviation generated in the relationship between the lift degree and the rotation amount because of the disassembling and assembling of the engine 7. Meanwhile, an arbitrary rotation amount (such as the reference angle) may be used instead of the idle rotation amount.

The magnetic pole sensors 152 do not have to be provided. In this case, the actual rotation amount of the control shaft 57 obtained from the control shaft sensor 151 may be used instead of the magnetic pole pulse pattern.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A variable valve device comprising:
    a control shaft arranged to change a lift degree of an intake valve in an engine;
    a memory arranged to store an adjustment angle that is a rotation angle of the control shaft while the engine is idling;
    an angle specifying information obtainer arranged to obtain angle specifying information specifying the rotation angle of the control shaft;
    a determiner arranged to determine whether or not an information difference between the angle specifying information obtained by the angle specifying information obtainer before the engine starts and a predetermined reference angle specifying information is within a predetermined information range; and
    a changer arranged to change the adjustment angle stored in the memory if the information difference is not within the predetermined information range.

2. The variable valve device according to claim 1, further comprising:
    a motor arranged to rotate the control shaft; and
    a motor driver arranged to drive the motor; wherein
    the changer is arranged to allow the motor driver to drive the motor so that an engine speed of the engine is within a predetermined speed range if the information difference is not within the predetermined information range and to change the adjustment angle based on the angle specifying information obtained by the angle specifying information obtainer when the engine speed of the engine is within the predetermined speed range.

3. The variable valve device according to claim 2, further comprising a gear position determiner arranged to determine whether a gear position of a transmission is neutral, wherein if the gear position of the transmission is neutral as determined by the gear position determiner, the changer is arranged to allow the motor driver to drive the motor so that the engine speed of the engine is within the predetermined speed range.

4. The variable valve device according to claim 2, further comprising an accelerator opening degree determiner arranged to determine whether an opening degree of the accelerator is zero for at least a predetermined period, wherein if the opening degree of the accelerator is zero for at least the predetermined period as determined by the accelerator opening degree determiner, the changer is arranged to allow the motor driver to drive the motor so that the engine speed of the engine is within the predetermined speed range.

5. The variable valve device according to claim 2, further comprising:
    a motor driving determiner arranged to determine whether the motor is actually driven by attempting to drive the motor if the information difference is not within the predetermined information range; and
    a motor driving prohibiter arranged to prohibit the motor driver from driving the motor if the motor is not driven as determined by the motor driving determiner.

6. The variable valve device according to claim 1, further comprising:
    a motor arranged to rotate the control shaft; and
    a motor driver arranged to drive the motor; wherein
    the angle specifying information obtainer includes:
        a control shaft sensor arranged to detect the rotation angle of the control shaft; and
        a control shaft rotation amount estimator arranged to calculate a rotation angle of the motor and to calculate an estimated rotation amount of the control shaft based on the calculated rotation angle; wherein
    the variable valve device further includes:
        a rotation amount difference determiner arranged to determine whether an amount difference between an actual rotation amount calculated based on the rotation angle detected by the control shaft sensor and the estimated rotation amount calculated by the control shaft rotation amount estimator is within a predetermined amount range; and a motor driving prohibiter arranged to prohibit the motor driver from driving the motor if the amount difference is not within the predetermined amount range as determined by the rotation amount difference determiner.

7. The variable valve device according to claim 1, further comprising an alarm arranged to notify a driver of a vehicle having the engine of predetermined information if the information difference is not within the predetermined information range.

8. The variable valve device according to claim 1, further comprising a reference angle specifying information updater arranged to update the predetermined reference angle specifying information with angle specifying information obtained by the angle specifying information obtainer after the engine stops.

9. An engine comprising a variable valve device, the engine comprising:
   an intake valve;
   a control shaft arranged to change a lift degree of the intake valve;
   a memory arranged to store an adjustment angle that is a rotation angle of the control shaft while the engine is idling;
   an angle specifying information obtainer arranged to obtain angle specifying information specifying the rotation angle of the control shaft;
   a determiner arranged to determine whether or not an information difference between the angle specifying information obtained by the angle specifying information obtainer before the engine starts and a predetermined reference angle specifying information is within a predetermined information range; and
   a changer arranged to change the adjustment angle stored in the memory if the information difference not within the predetermined information range.

10. A motorcycle comprising:
an engine including an intake valve and a variable valve device including:
   a control shaft arranged to change a lift degree of the intake valve;
   a memory arranged to store an adjustment angle that is a rotation angle of the control shaft while the engine is idling;
   an angle specifying information obtainer arranged to obtain angle specifying information specifying the rotation angle of the control shaft;
a determiner arranged to determine whether or not an information difference between the angle specifying information obtained by the angle specifying information obtainer before the engine starts and a predetermined reference angle specifying information is within a predetermined information range; and
   a changer arranged to change the adjustment angle stored in the memory if the information difference is not within a predetermined information range.

* * * * *